(12) United States Patent
Moe et al.

(10) Patent No.: US 7,954,757 B2
(45) Date of Patent: Jun. 7, 2011

(54) LANDING GEAR NOISE ATTENUATION

(75) Inventors: Jeffrey W. Moe, Chula Vista, CA (US); Julia Whitmire, Chula Vista, CA (US); Hwa-Wan Kwan, Chula Vista, CA (US); Amal Abeysinghe, Bonita, CA (US)

(73) Assignee: Goodrich Corporation, Charlotte, NC (US)

( * ) Notice: Subject to any disclaimer, the term of this patent is extended or adjusted under 35 U.S.C. 154(b) by 955 days.

(21) Appl. No.: 10/599,495

(22) PCT Filed: Mar. 25, 2005

(86) PCT No.: PCT/US2005/010082
§ 371 (c)(1), (2), (4) Date: Aug. 20, 2007

(87) PCT Pub. No.: WO2005/096721
PCT Pub. Date: Oct. 20, 2005

(65) Prior Publication Data
US 2008/0142634 A1    Jun. 19, 2008

Related U.S. Application Data

(60) Provisional application No. 60/557,236, filed on Mar. 29, 2004, provisional application No. 60/641,246, filed on Jan. 4, 2005.

(51) Int. Cl.
*B64C 25/00* (2006.01)
(52) U.S. Cl. ............ 244/100 A; 244/100 R; 244/102 R; 244/102 A
(58) Field of Classification Search ............... 244/100 A, 244/100 R, 102 R
See application file for complete search history.

(56) References Cited

U.S. PATENT DOCUMENTS

| 202,634 | A | 4/1878 | Connor |
| 1,446,531 | A | 2/1923 | Williams, Jr. |
| 2,129,824 | A | 9/1938 | De Seversky |
| 2,176,461 | A | 10/1939 | Larsen |
| 2,180,462 | A | 11/1939 | De Seversky |
| 2,363,126 | A | 11/1944 | Gibson |

(Continued)

FOREIGN PATENT DOCUMENTS

CA    2223543    6/1998

(Continued)

OTHER PUBLICATIONS

Ahuja K.K., Martin, J., Miller B., & Gu X., "On Automobile Antenne and Roof Rack Noise Control," AIAA 93-4398, 15th AIAA Aeroacoustics Conference, Long Beach, CA, Oct. 25-27, 1993.

(Continued)

*Primary Examiner* — J. Woodrow Eldred
(74) *Attorney, Agent, or Firm* — Womble Carlyle Sandridge & Rice, PLLC

(57) ABSTRACT

A landing gear noise attenuator mitigates noise generated by airframe deployable landing gear. The noise attenuator can have a first position when the landing gear is in its deployed or down position, and a second position when the landing gear is in its up or stowed position. The noise attenuator may be an inflatable fairing that does not compromise limited space constraints associated with landing gear retraction and stowage. A truck fairing mounted under a truck beam can have a compliant edge to allow for non-destructive impingement of a deflected fire during certain conditions.

32 Claims, 33 Drawing Sheets

U.S. PATENT DOCUMENTS

| | | | |
|---|---|---|---|
| 2,406,710 | A | 8/1946 | Riggles, Jr. |
| 2,652,214 | A | 9/1953 | Cussons |
| 2,719,016 | A | 9/1955 | Wicks |
| 2,747,817 | A | 5/1956 | Saulnier |
| 4,027,836 | A | 6/1977 | Seibel |
| 5,058,827 | A | 10/1991 | Dansereau et al. |
| 5,104,063 | A | 4/1992 | Harley |
| 5,156,353 | A | 10/1992 | Gliebe et al. |
| 5,209,434 | A | 5/1993 | Lo Presti et al. |
| 5,269,481 | A | 12/1993 | Derrien |
| 5,478,030 | A | 12/1995 | Derrien et al. |
| 5,749,546 | A | 5/1998 | Blackner et al. |
| 6,032,090 | A | 2/2000 | von Bose |
| 6,048,477 | A | 4/2000 | Thorpe et al. |
| 6,173,920 | B1 | 1/2001 | Meneghetti |
| 6,454,219 | B1 | 9/2002 | Moe |
| 6,457,680 | B1 | 10/2002 | Dobrzynski et al. |
| 6,619,587 | B1 | 9/2003 | Chow et al. |
| 6,786,451 | B2 * | 9/2004 | Courtois et al. .......... 244/102 R |
| 2003/0102406 | A1 | 6/2003 | Chow et al. |
| 2003/0152145 | A1 | 8/2003 | Kawakita |
| 2003/0164423 | A1 | 9/2003 | Courois et al. |
| 2003/0225492 | A1 | 12/2003 | Cope et al. |
| 2004/0040797 | A1 | 3/2004 | Plude et al. |
| 2004/0104301 | A1 | 6/2004 | Wickerhoff et al. |

FOREIGN PATENT DOCUMENTS

| | | |
|---|---|---|
| DE | 69715787 | 2/2003 |
| EP | 846540 | 6/1998 |
| EP | 1067045 | 10/2001 |
| EP | 1192077 | 8/2004 |
| EP | 1340676 | 6/2005 |
| ES | 2179282 | 6/1998 |
| FR | 2836667 | 7/2004 |
| GB | 494542 | 10/1938 |
| GB | 534522 | 3/1941 |
| GB | 745965 | 3/1956 |
| GB | 9915977 | 9/1999 |
| GB | 2319981 | 8/2001 |
| JP | 2003/504267 | 2/2003 |
| WO | WO01/04003 | 1/2001 |

OTHER PUBLICATIONS

Carter, Guillot, Ng & Copenhaver, "Aerodynamic Performance of a High-Turning Compressor Stator with Flow Control," AIAA 37th Joint Propulsion Conf., 2001, Salt Lake City, Utah.

Davy, R. & Remy, H., "Airframe Noise Characteristics of a 1/11 Scale Airbus Model", 4th AIAA/CEAS Aeroacoustics Conf., Jun. 2-4, 1998, Toulouse, France.

Dobrzynski W. & Buchholz H., Full-Scale Noise Testing on Airbus Landing Gears in the German Dutch Wind Tunnel, 3rd AIAA/CEAS Aeroacoustics Conf, Paper 97-1597, May 12-14, 1997.

Dobrzynski W., Chow L.C., Guion P., &Shiells D., A European Study on Landing Gear Airframe Noise Sources, 5th AIAA/CEAS Aeroacoustics Conference & Exh., Jun. 12-14, 2000.

Fink M.R., Airframe Noise Prediction Methods, FAAA-RD-77-29, 1977.

Fink, Martin R. & Bailey, D.A., Model Test of Airframe Noise Reduction Concepts, AIAA 6th Aeroacoustics Conf, Jun. 4-6, 1980, Hartford, CT.

Hardin, Jay C., Toward a Comprehensive Analysis of Landing Approach Noise Sources, AIAA-97-1593-CP, 1997.

Hayes, Julie A.; Horne, W. Clifton; Soderman, Paul T. & Bent, Paul H., Airframe noise characteristics of a 4.7% scale DC-10 model, AIAA-97-1594-CP.

Heidelberg, L.J., Hall, D.G., Bridges, J.E., & Nallasamy, M., A Unique Ducted Fan Test Bed for Active Noise Control and Aeroacoustics Research, CEAS/AIAA-96-1740, May 1996.

Heller, Hanno H. & Dobrzynski, Werner M., Sound Radiation From Aircraft Wheel-Well/Landing-Gear Configurations, Journal of Aircraft, vol. 14, No. 8, 1977.

Heller, Hanno H. & Dobrzynski, W.M., Unsteady Pressure Characteristics on Aircraft Components and Far-field Radiated Airframe Noise, Journal of Aircraft, vol. 15, #12, Dec. 1978.

Jaeger, S.M., 777 Landing Gear Acoustics: Even More Preliminary Acoustic Results, NASA AST-QAT 4th Airframe Noise.

Konstadinopoulos, P., Mook, D.T., & Nayfeh, A.H. (1981), A Numerical Method for General Unsteady Aerodynamics, AIAA Atmospheric Flight Mechanics Conf, 1981.

Konstadinopoulos, P., Thrasher, D.F., D.T. Mook, Nayfeh, A.H., & Watson, L.(1985), A Vortex-Lattice Method for General, Unsteady Aerodynamics, Journal of Aircraft, 22(1),43-49.

Larssen J.V. & Devenport W.J., Acoustic Properties of the Virginia Tech Stability Wind Tunnel, Dept of Aerospace & Ocean Eng, VA Tech, Rpt VPI-AOE 263,1999.

Macaraeg M.G., Fundamental Investigation of Airframe Noise, NASA Langley Research Center Report, 1998.

Miller, Wendell R.; Meecham, William C. & Ahtye, Warren F., Large Scale Model Measurements of Airframe Noise Using Cross-Correlation Techniques, J.Acoust. Soc. Am. 71(3), Mar. 1982.

Munson A.G., A Modeling Approach to Nonpropulsive Noise, AIAA 76-525, 1976.

Piet, Jean-Francois & Elias Georges, Airframe Noise Source Localization Using a Microphone Array, AIAA-97-1643-CP.

Preidikman, S. Numerical Simulations of Interactions Among Aerodynamics, Structural Dynamics, and Control Systems, PhD thesis, VA Polytechnic Inst. & State Unv., 1998.

Rao,W.M., Feng,J., Burdisso, R.A., Wg,W.F., Experimental Demonstration of Active Flow Control to Reduce Unsteady Stator-Rotor Invention, AIAA J., vol. 39, #3, Mar. 2001, pp. 458-464.

Stoker,R.W. & Sen, R., An Experimental Investigation of Airframe Noise Using a Model-Scale Boeing 777, AIAA-2001-0987, 39th AIAA Aerospace Sciences Mtg & Exh,Jan. 8, 2001, Reno, NV.

Stoker, R.W., Recent Airframe Noise Testing Done by Boeing, Presented at the NASA AST-QAT 4th Airframe Noise Workshop, Dec. 2000.

Stoker, R.W., Underbrink, J.R. & Neubert, F.R., Investigations of Airframe Noise in Pressurized Wind Tunnerls, AIAA-2001-2107, 7th AIAA/CEAS Aeroacoustics Conf, May 28, 2001, NL.

Willshire, W.L., Jr. & Garber, D.P., Advanced Subsonic Transport Approach Noise—The Relative Contribution of Airframe Noise, NASA Tech Memo 104112, Jun. 1992.

International Preliminary Search Report on Patentability, Int. Application No. PCT/US2005/010082 dated Oct. 4, 2006.

* cited by examiner

Fig. 6A  Fig. 6B

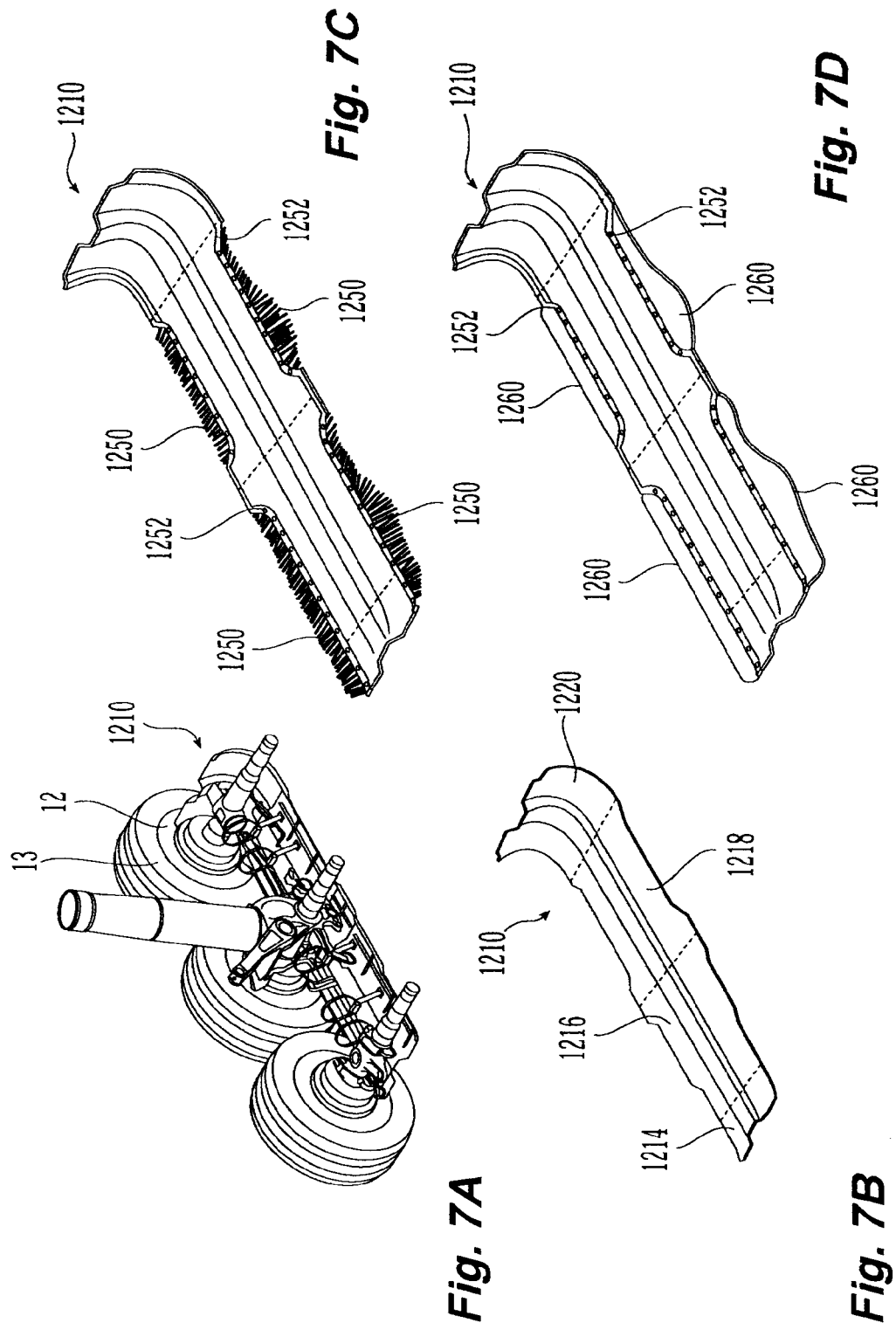

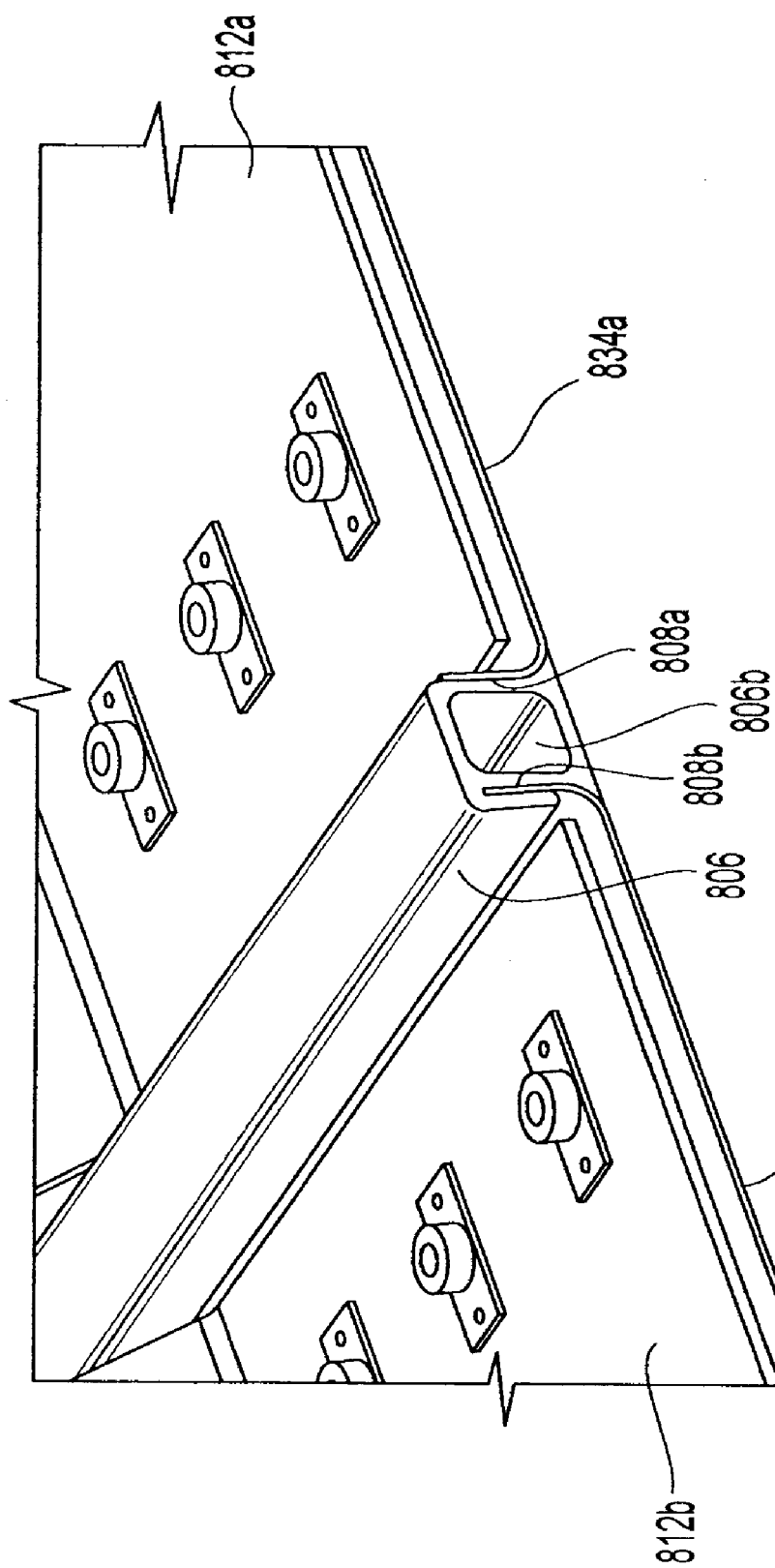

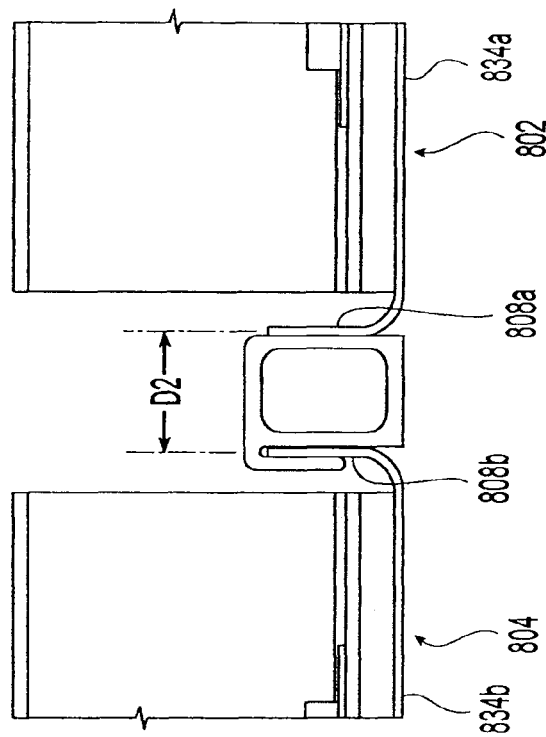
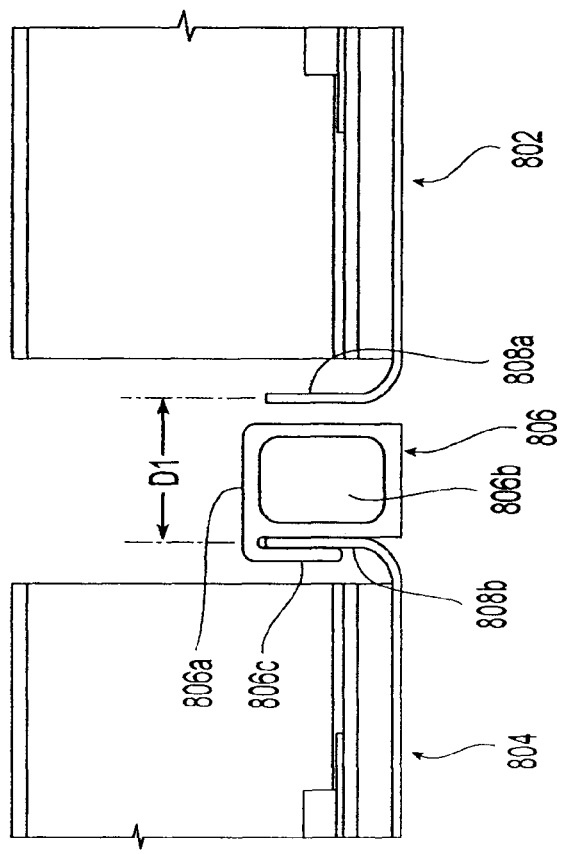
Fig. 8C
Fig. 8D

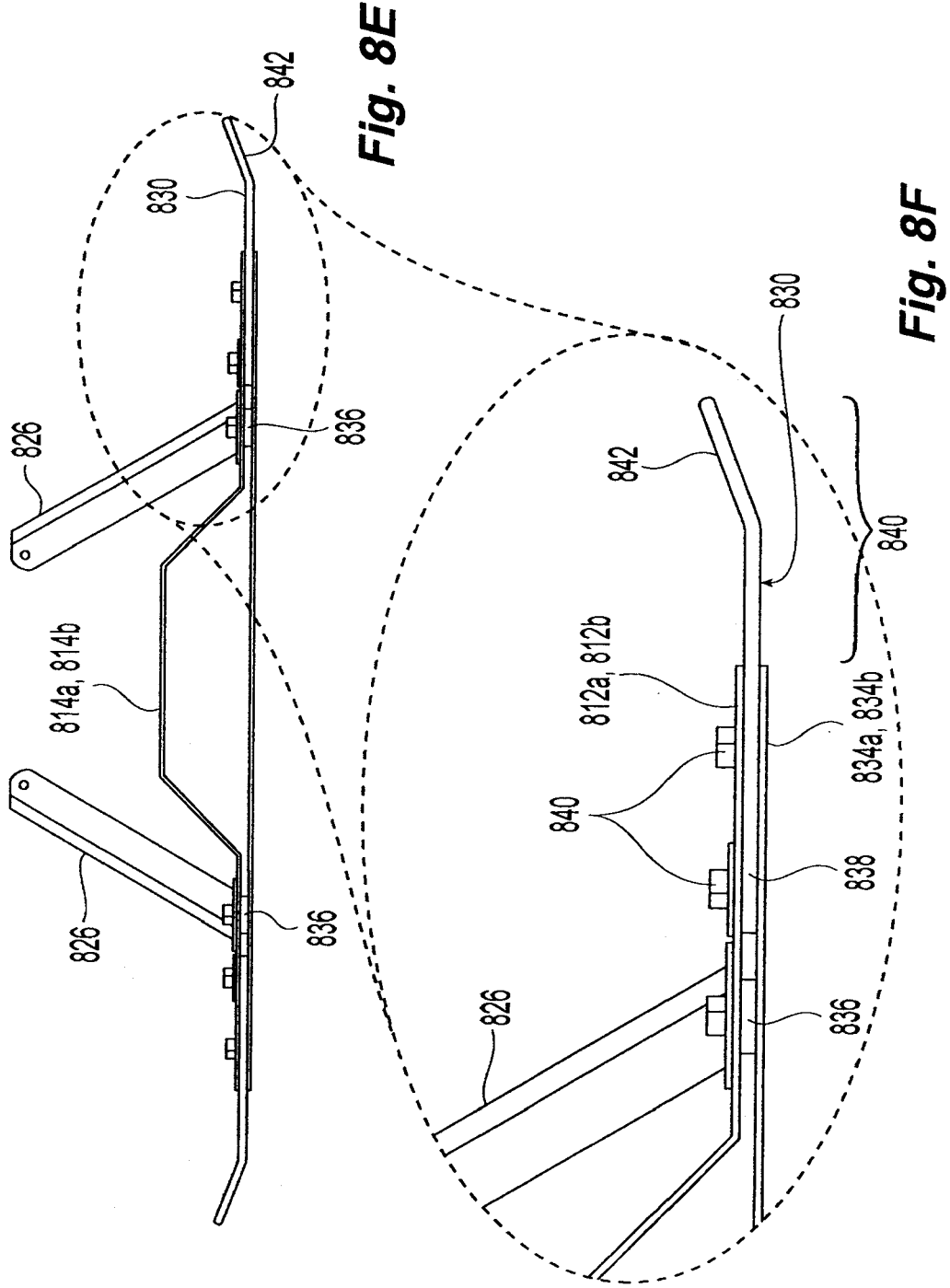

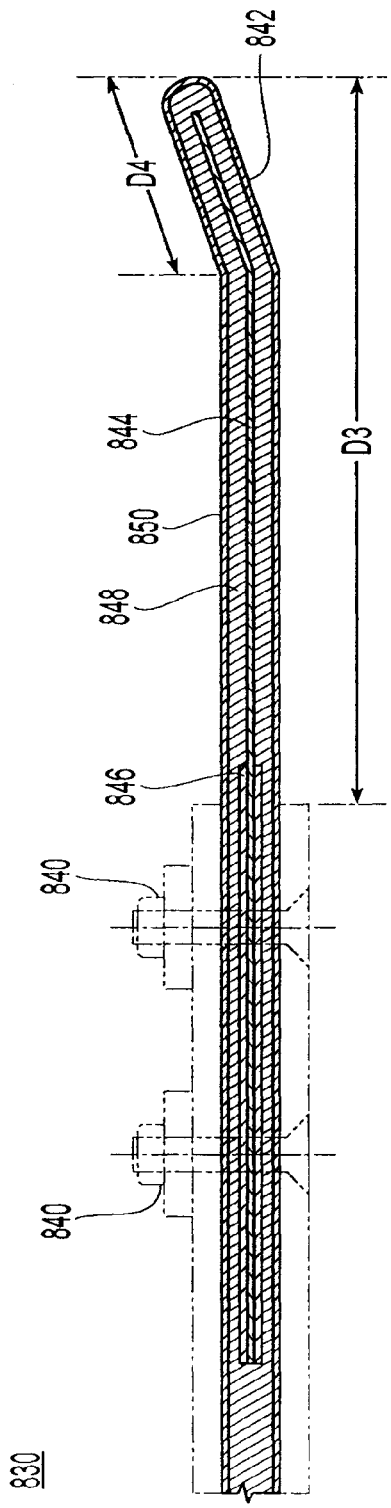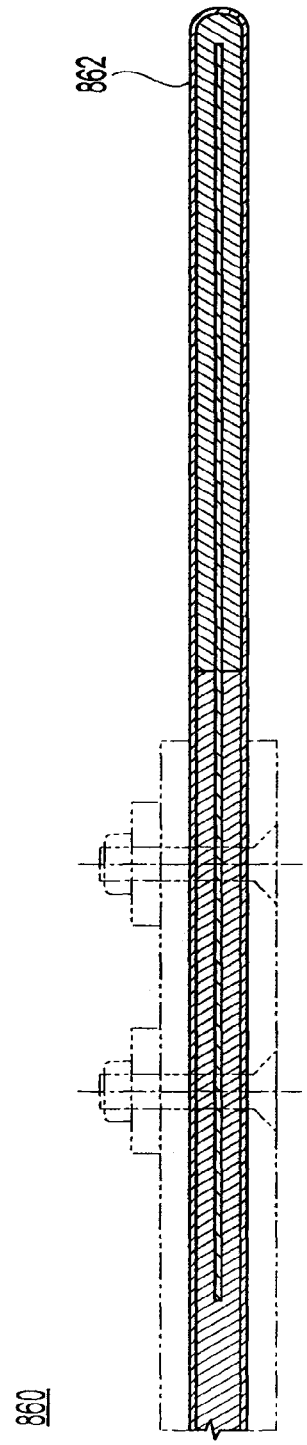
Fig. 8G
Fig. 8H

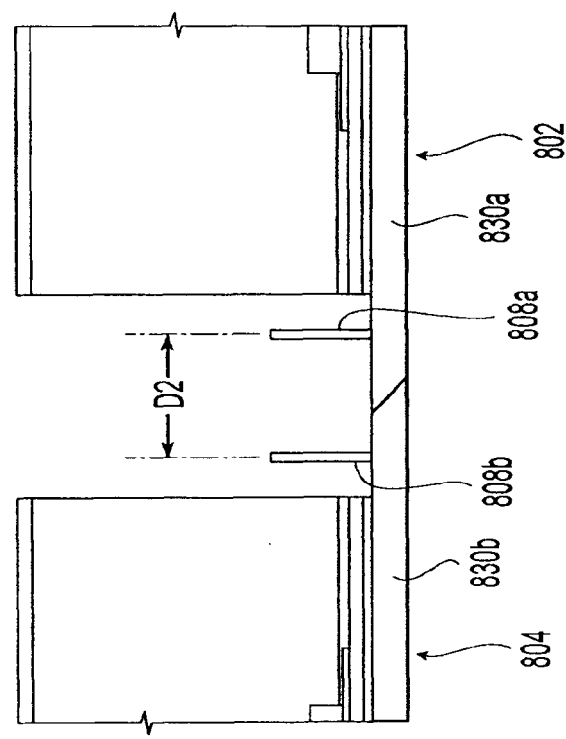
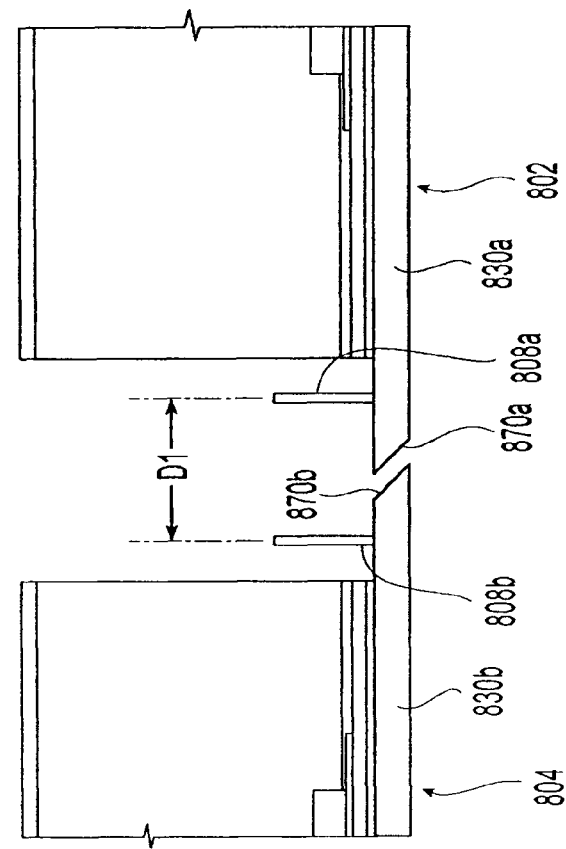
Fig. 8I
Fig. 8J

LANDING GEAR NOISE ATTENUATION

RELATED APPLICATIONS

The present application claims priority to U.S. Provisional Patent Application No. 60/557,236, filed Mar. 29, 2004 and U.S. Provisional Patent Application No. 60/641,246, filed Jan. 4, 2005. The contents of these two provisional applications are incorporated by reference in their entirety.

STATEMENT REGARDING FEDERALLY SPONSORED RESEARCH

Some aspects of the inventions described in this patent application were made in the performance of work under NASA Contract No. NAS1-03008 and may be subject to the provisions of Section 305 of the National Aeronautics and Space Act of 1958 (42 U.S.C. 2457).

FIELD OF THE INVENTION

This invention relates to landing gear noise attenuation and more specifically to apparatus intended to mitigate airframe landing gear noise.

BACKGROUND

The interaction of airflow with an airframe's protrusions and cavities creates airframe noise. While engine noise dominates aircraft noise at takeoff, the airframe noise created by landing gear is a substantial contributor to approach noise for many aircraft. During approach, an aircraft engine is operating at less power than that during takeoff. Hence, the noise from the airframe is comparable to that of the engine noise.

The landing gear of commercial aircraft represent a complex system of wheels, axles, trucks or bogie beams, brakes, cable harnesses, torque links, braces, structure interfaces and wheel hubs. Skilled landing gear designers traditionally have emphasized the operational parameters attendant to proper deployment, operation and retraction of landing gear, and have not previously been directed to address noise attenuation as a design priority. While various noise reduction designs are known for fixed landing gear noise attenuators for deployable landing gears are less developed.

There is a need for retractable landing gear attenuation structures that successfully reduce noise emanating from the landing gear acoustic signature. The complexity of non-acoustical constraints on the design of landing gears have not permitted effective and practical noise minimization designs.

SUMMARY OF THE INVENTION

The present invention is directed to devices and systems for noise attenuation of deployable landing gear.

In one aspect, the invention is directed to deployable landing gear truck fairing which comprises: an elongated body connected to a rising front portion, the elongated body having first and second lateral edges; and first and second compliant edges affixed to corresponding first and second lateral edges.

The elongated body comprises a forward assembly and an aft assembly; the first lateral edge comprises adjacent first and second lateral edge portions on a first side of the fairing, the first lateral edge portion being associated with the forward assembly and the second lateral edge portion being associated with the aft assembly; and the second lateral edge comprises adjacent third and fourth lateral edge portions on a second side of the fairing, the third lateral edge portion being associated with the forward assembly and the fourth lateral edge portion being associated with the aft assembly.

A first compliant edge portion may be affixed to the first lateral edge portion; a second compliant edge portion may be affixed to the second lateral edge portion; a third compliant edge portion may be affixed to the third lateral edge portion; and a fourth compliant edge portion may be affixed to the fourth lateral edge portion, such that the first and second compliant edge portions are adjacent to one another and the third and fourth compliant edge portions are adjacent to one another.

When the truck fairing is mounted on deployable landing gear of an aircraft, adjacent compliant edge portions are spaced apart from one another by a first distance when the aircraft is on the ground; and move closer to one another when the aircraft is not on the ground.

In another aspect, the invention is directed to a deployable landing gear truck fairing, comprising: a pair of adjacent fairing sections defining a forward assembly and an aft assembly suitable for mounting on a truck, each assembly having a first side and a second side; a center seal affixed to at least one of the forward and aft assemblies and positioned between the two assemblies; adjacent first and second compliant edge portions affixed to the first side of the forward and aft assemblies; and adjacent third and fourth compliant edge portions affixed to the second side of the forward and aft assemblies.

When the truck fairing is mounted on deployable landing gear of an aircraft, adjacent compliant edge portions are spaced apart from one another by a first distance when the aircraft is on the ground; and move closer to one another when the aircraft is not on the ground.

Opposing surfaces of adjacent compliant edge portions may abut one another when the aircraft is not on the ground. These opposing surfaces may be are angled.

In yet another aspect, the present invention is directed to a landing gear noise attenuator for deployable landing gear having a truck beam and tires. The attenuator comprises a tray positioned under the truck beam; a rigid portion on the tray; and at least one compliant edge on the tray, the compliant edge being proximate to the tires and capable of yielding elastically when a force is applied to the edge.

In yet another aspect, the present invention is directed to an inflatable, deployable landing gear noise attenuator adjustable between a first, deflated position when the deployable landing gear is retracted, and a second, inflated position when the deployable landing gear is deployed. The inflatable noise attenuator may take on one of several forms. For example, the noise attenuator may be an inflatable door panel fairing suitable for attaching to a portion of a door panel. The noise attenuator may be an inflatable main strut fairing suitable for mounting on a main strut of a landing gear assembly. The inflatable door panel may be attached to the inflatable main strut fairing. The noise attenuator may be an inflatable truck fairing suitable for mounting on a truck of a landing gear assembly. The noise attenuator may be an inflatable drag strut fairing suitable for mounting on a drag strut of a landing gear assembly. The noise attenuator may be an inflatable torque link fairing suitable for surrounding a torque link of a landing gear assembly. A torque link panel may be associated with the torque link panel. The inflatable torque link may be attached to the inflatable truck fairing.

In yet another aspect, the present invention is directed to a system for inflating and deflating inflatable deployable landing gear noise attenuators. Such a system comprises a reservoir configured to store pressurized air of sufficient pressure to inflate one or more of said noise attenuators, said reservoir being connected to a pressure regulator; vacuum means configured to remove air from said noise attenuators; and a manifold configured to selectively connect said reservoir and said vacuum means to said noise attenuators.

A compressor or engine air bleed may be used to charge the reservoir. The vacuum means may be a dedicated vacuum pump or a engine vacuum device.

In yet another aspect, the present invention is directed to apparati for passive noise reduction of landing gear. An exemplary apparatus is a brake cover fairing partially covering a piston and piston housing of a front brake of a landing gear assembly and having a less than full circumferential design. Another exemplary apparatus is a fairing insert suitable for inserting into a pocket of a brace belonging to a landing gear assembly, the fairing insert having a bulbous front section and a tapered rear section to help minimize noise generation. Yet another exemplary apparatus is a pocket filler fairing secured in a pocket of a brace belonging to a landing gear assembly by means of a non-removable fastener. Yet another exemplary apparatus is a door/strut interface noise reduction fairing comprising a multi-piece fairing that attaches to a shock strut via an existing hydraulic and/or electrical bracket along a length of said shock strut. Yet another exemplary apparatus is a tear-drop shaped shock strut fairing extending from an interface gap around a front of the shock and covering electrical and hydraulic lines that extend along the front of the shock, the tear-drop shaped fairing being configured to allow the shock strut to function both in a deployed pre-touchdown position, and also in compressed position after touchdown.

These and other aspects of the present invention will become apparent to those skilled in the art after a reading of the following description of the preferred embodiments, when considered in conjunction with the drawings. It should be understood that both the foregoing general description and the following detailed description are exemplary and explanatory only and are not restrictive of the invention as claimed.

BRIEF DESCRIPTION OF THE DRAWINGS

FIGS. 6A through 6D are views of a truck and fairing in accordance with an embodiment of the present invention.

FIGS. 7A through 7E are views of a truck fairings of the present invention.

FIG. 8B is a view of a close-up of a center seal of truck fairing of FIG. 8A.

FIG. 8C shows the separation between the forward and aft assemblies when the aircraft is on the ground, for the truck fairing of FIG. 8A.

FIG. 8D shows the forward and aft assemblies in abutment via the center seal, when the aircraft is in air, for the truck fairing of FIG. 8A.

FIG. 8E shows a cross-section of either the forward or aft assembly of the truck fairing of FIG. 8A.

FIG. 8F shows a close-up of one side of FIG. 8E.

FIG. 8G shows a cross-section of a compliant edge in accordance with one embodiment of the present invention.

FIG. 8H shows a cross-section of a compliant edge in accordance with another embodiment of the present invention.

FIG. 8I shows a side view of the separation of a compliant edge when an aircraft is on the ground.

FIG. 8J shows a side view of a compliant edge when an aircraft is in the air.

DETAILED DESCRIPTION

Landing gear fairings are an effective approach to reduce noise. Fairings improve the aerodynamic characteristics of the landing gear system, such that the unsteadiness of the airflow is minimized. While fixed fairings have been used traditionally for non-retractable landing gear, the employment of fairings in conjunction with retractable landing gear is limited due to the confined space of the fuselage nose section and of the relatively thin wing sections.

Due to size constraints, a full enveloping fixed fairing for a landing gear is not feasible. Alternatively, significant noise attenuation is achievable by partially fairing critical components of landing gear.

Figure 1:
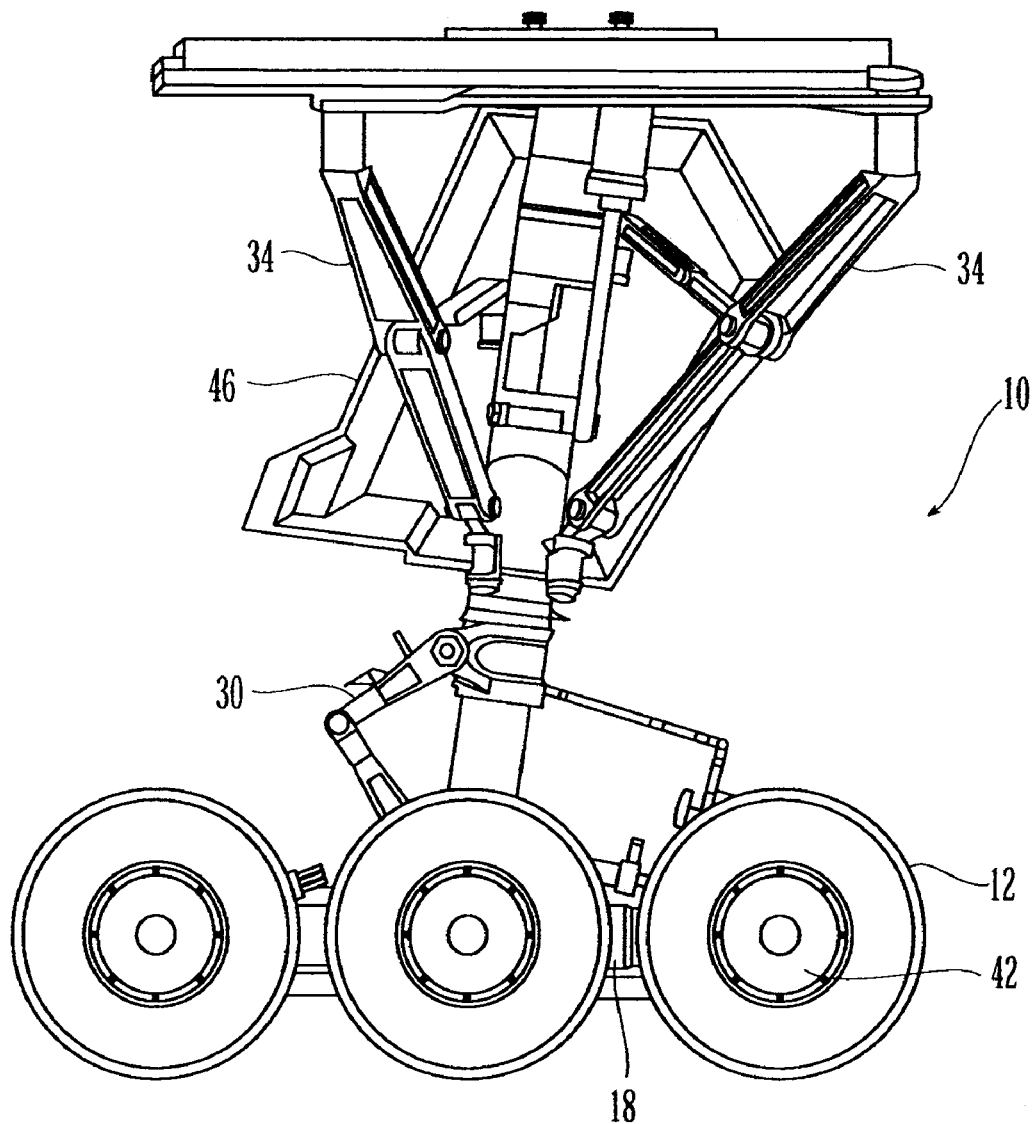
FIGS. 1 through 3 are views of a conventional prior art landing gear assembly.
Figure 2:
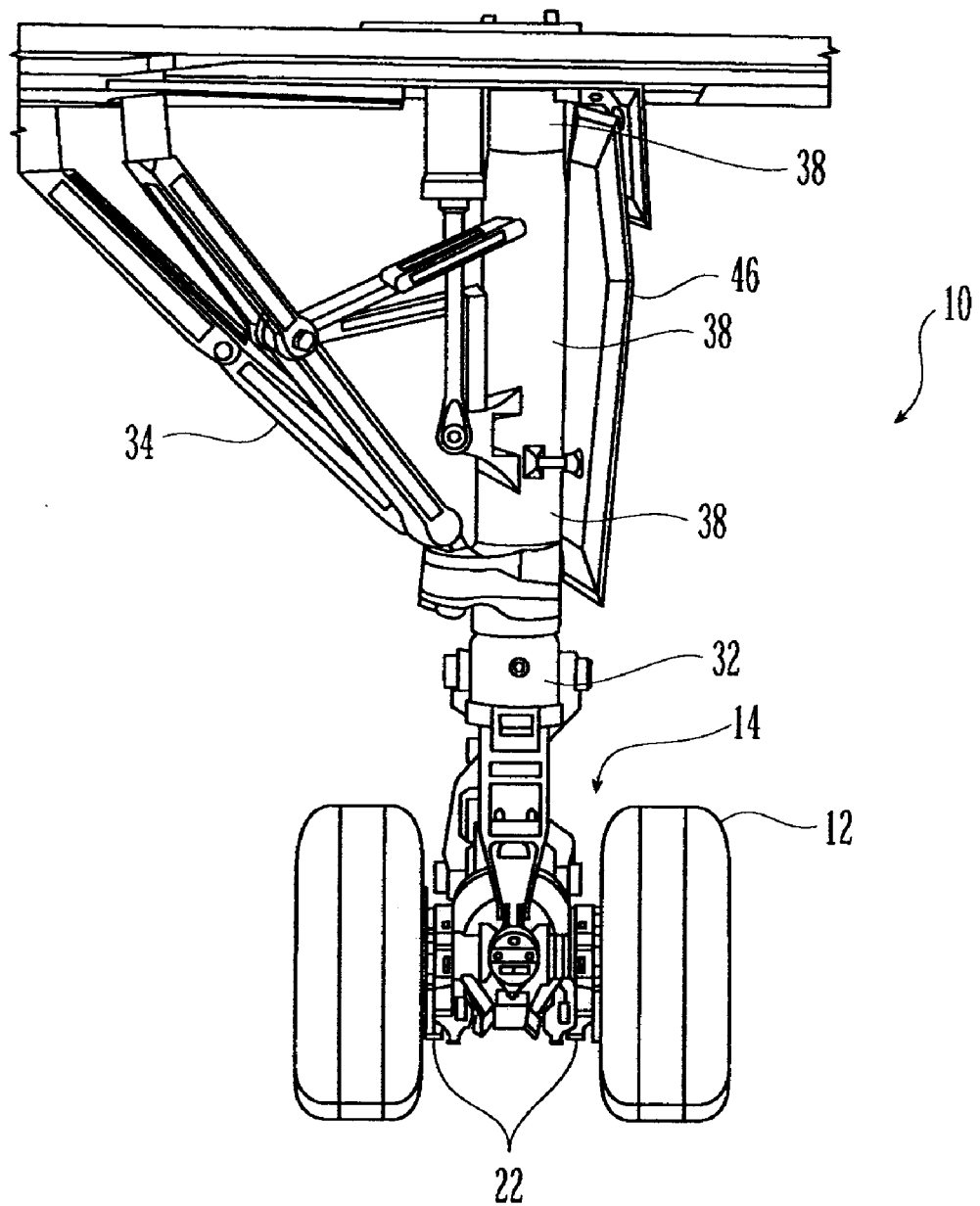
Figure 3:
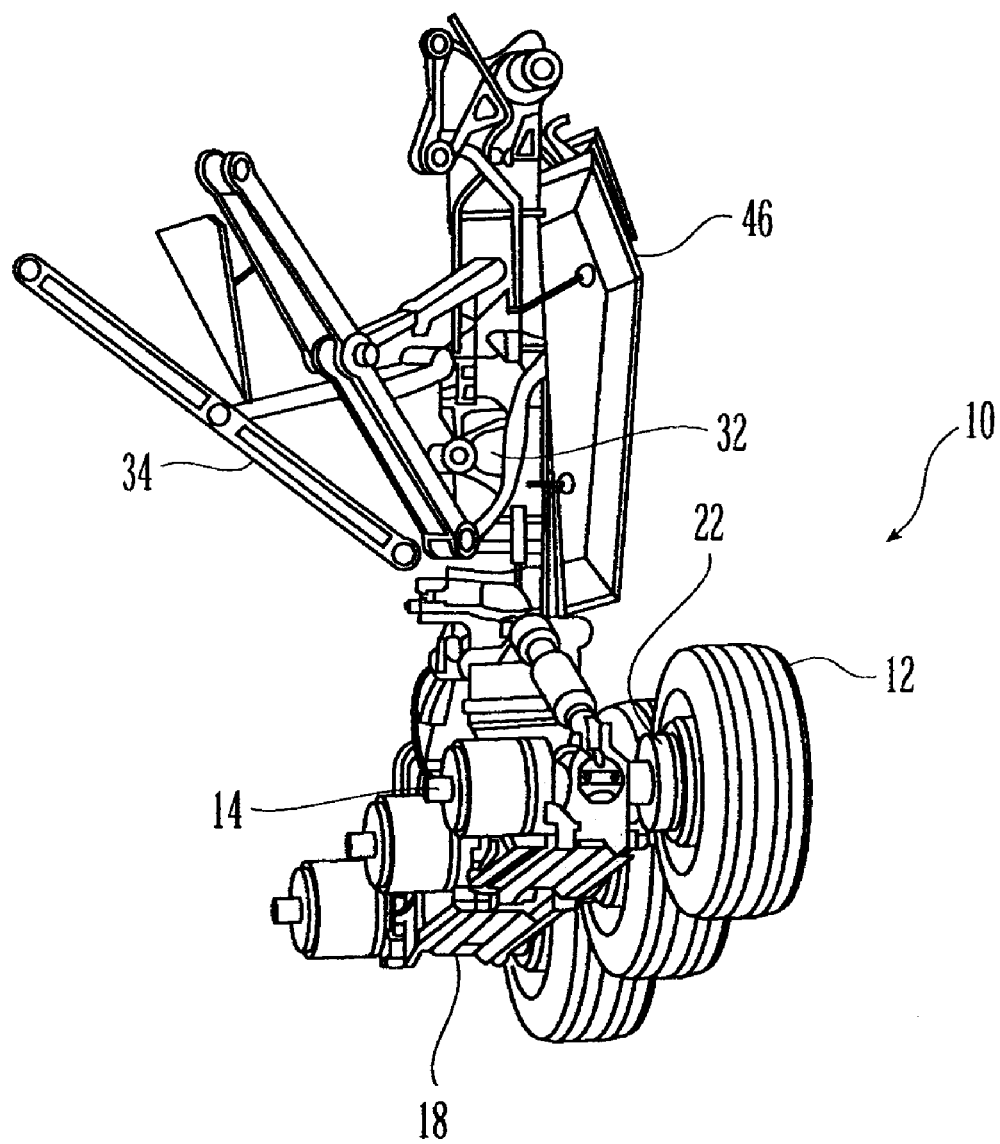

FIGS. 1, 2 and 3 illustrate a conventional main landing gear 10. For ease of illustration, certain cable harnesses and hydraulic lines are not shown. Landing gear 10, shown in a deployed position, includes wheels 12, axles 14, trucks or bogie beams 18, brakes 22, cable harnesses (not shown), torque links 30, struts 32, braces 34, structure interfaces 38, wheel hubs 42 and door 46. Unless otherwise stated, the terms "down or deployed position" mean when the landing gear is deployed, but prior to contact with a runway or other landing surface.

Figure 4:
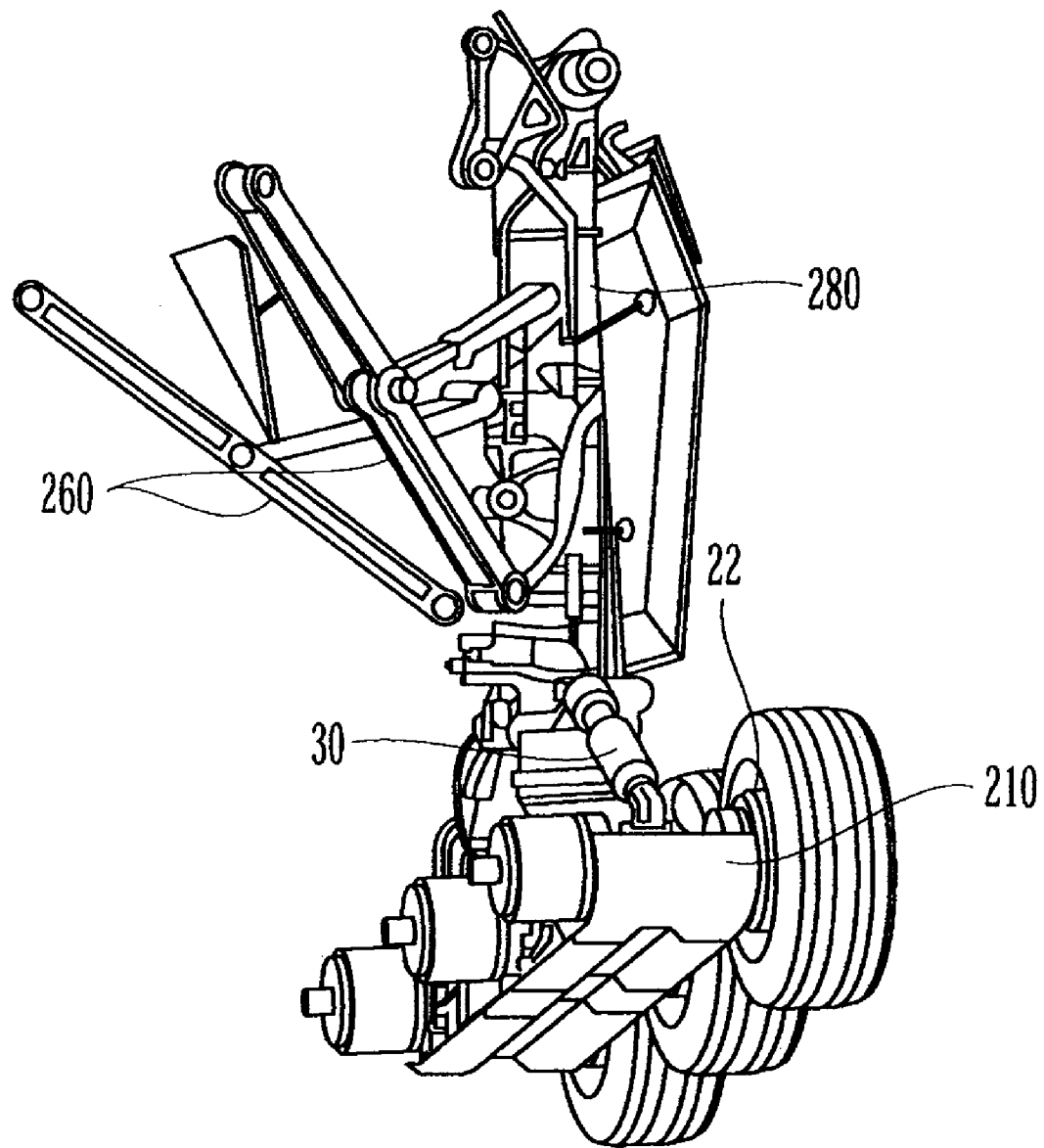
FIG. 4 is a landing gear containing fairings in accordance with an embodiment of the present invention.

Selected landing gear components are suitable for adaptation, modification or redesign featuring aerodynamic components. FIG. 4 illustrates several types of fixed fairings covering or shielding selected landing gear components.

Figure 5A:
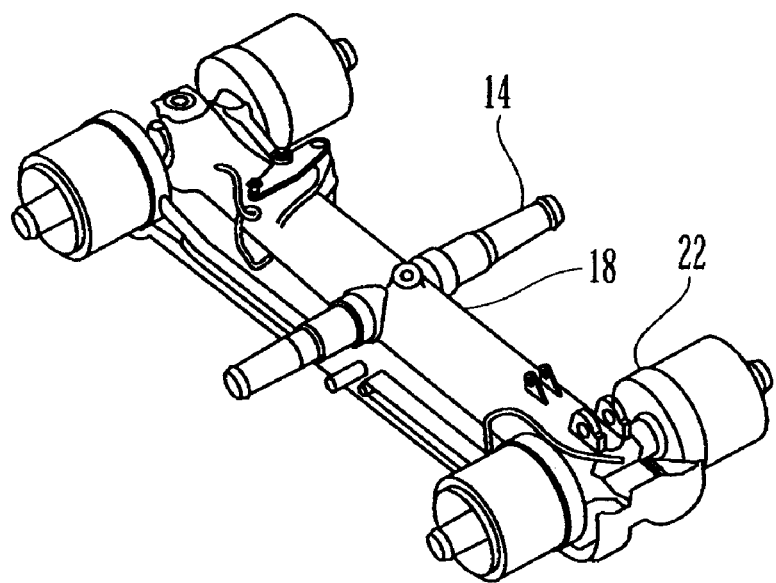
FIG. 5A is a partial isometric view of landing gear containing fairings in accordance with an embodiment of the present invention.
Figure 5B:
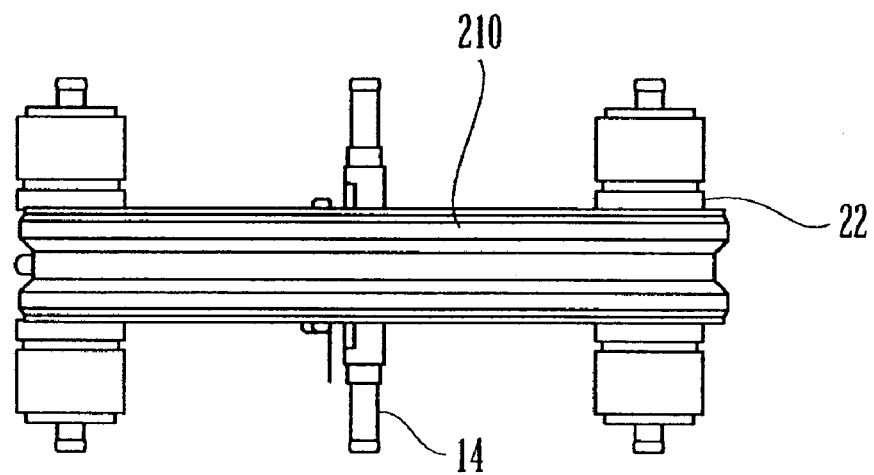
FIG. 5B is a partial underside view of a landing gear containing fairings in accordance with an embodiment of the present invention.
Figure 6C:
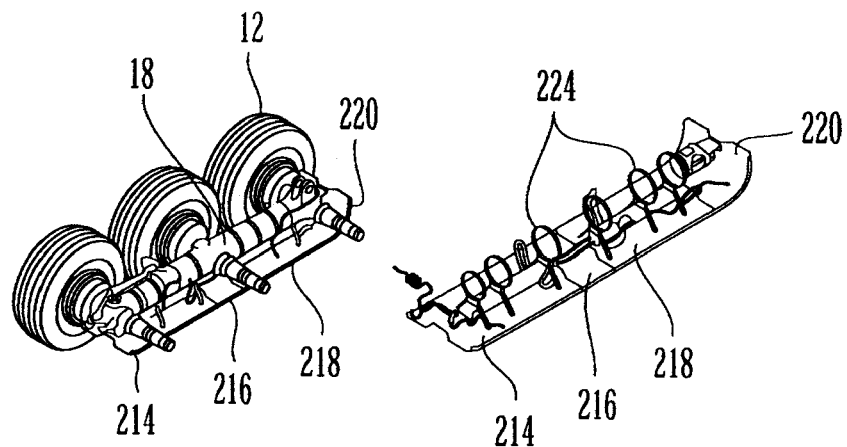
Figure 6C:
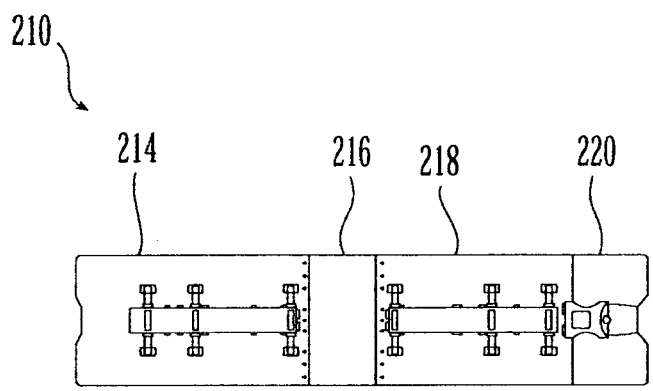
Figure 6D:
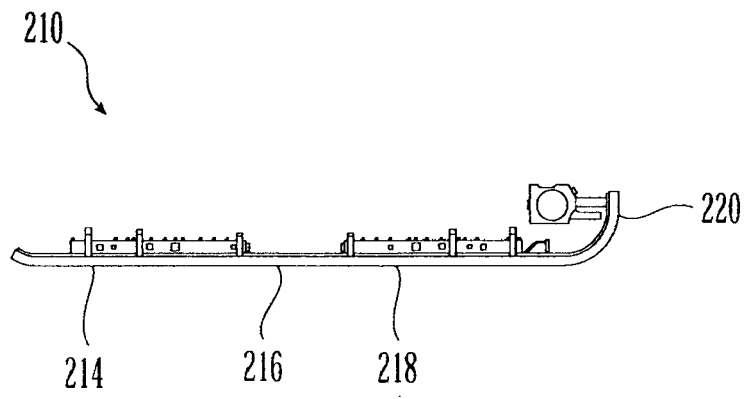

As shown in FIGS. 4, 5A and 5B, a truck fairing 210 can cover the forward end, underside, and aft end of the truck beam, respectively. The truck fairing 210 also can extend to cover the brakes 22, and certain wire harness (not shown). In another embodiment, the truck fairing 210 may extend to cover the torque links 30. FIG. 5A shows an isometric view of the fairing 210 covering the truck beam 18, axles 14, and brakes (partially) 22 on a landing gear. FIG. 5B shows a view from the underside of the landing gear.

The truck fairing 210 may be a rigid structure, or may consist of a rigid lower fairing and a smart, or retractable, upper fairing. To accomplish a smart or retractable upper truck fairing, a localized torque link fairing along with bundled, shielded or rerouted cable harnesses may be employed. Alternatively, a truck fairing, or combination of fairings, that retract or rotate after landing to allow air flow for brake cooling, access to the tow fitting, and access to the jacking pad can be employed. The movement of the smart upper fairing can be accomplished by adding a powered hydraulic or electrical system to drive the fairing.

An alternative approach would be to use the stroking of the gear to static position and kinematics of braces or links to drive the fairing. In other words, as the landing gear goes through its deployment stage on approach, the hydraulic and/or electrical systems that are used to deploy the gear to its final, fully extend position can also be used to operate/deploy a smart upper truck fairing that addresses the torque link, forward and rear cable harness noise sources. Implementation of such methods and techniques are known to those of skill in the art.

The design of truck fairing 210 can reflect several design considerations. The fairing accommodates access to the jacking pads, tow fitting, and brakes 22. The lower portion of the fairing 210 blocks a substantial portion of the underside of the truck 18, but retains room for tire clearance. The truck fairing 210 can present a location for the collection of debris, and ease of inspection (and removal of such debris) is required. The truck fairing 210 also must be shaped and configured to allow for retraction and stowing of the gear in selected aircraft associated with the landing gear 10.

FIGS. 6A, 6B, 6C and 6D illustrate layouts of the truck fairing 210. For certain types of landing gear, installation of the fairing 210 will require modification of the existing gravel shields, which can be mounted to the two junction boxes on the underside of trucks. To assemble fairing 210, the design can comprise one or more separate fairing sections. Four fairing sections 214, 216, 218, 220 are shown in FIGS. 6A, 6B, 6C and 6D. Three of these fairings 214, 216, 218 can cover the underside of the truck 18, brake rods and brakes, with a fourth section 220 secured onto the tow fitting to cover the forward truck, tow fitting, jacking pad, and front brakes. The fairing 210 can be made of any aerospace-grade metal alloy, or of a suitable composite material, sheet metal or plastic.

The truck fairing 210 can be secured to the landing gear 10 in various manners. For example, standard fasteners already used on the landing gear truck 18 could be lengthened and used to restrain the fairings to existing brackets. Alternatively, band clamps 224 or other suitable forms of securing could be used to secure the fairing 210 to the truck 18.

The truck fairing 210 can reflect several design attributes. This fairing provides foreign object and debris protection to the truck 18. The fairings, suitably designed to withstand such impacts, will decrease the overall number of maintenance and repair requirements generated from foreign objects impacting the gear. The fairing 210 can be designed for ease of maintainability. Preferably, the design minimizes the removal and maintenance of the fairing 210, or, alternatively, if removal is needed, the removal and installation procedures are simple enough to not significantly increase the task time required for routine maintenance. In another embodiment, drain holes are incorporated in the fairing to allow removal of any hydraulic fluid or other liquids that may gather in the normal course of landing gear operation and servicing. Routine inspections can be performed to ensure that any foreign objects or debris, including rocks, safety wire, etc., has not collected in the fairing. If an actively driven smart fairing is installed on the truck 18, a routine inspection of the hydraulic or electrical system used to drive the smart fairing will be necessary.

FIGS. 7A-7E, 8, 8A-8H, and 9A-9C show a compliant edge and truck fairing. As used herein, "compliant" means willing to yield, extend or displace elastically in response to a force, but capable of substantially resuming its original shape thereafter. The compliant edge in this embodiment is proximate to the tires and capable of yielding elastically when a force is applied to the edge. The compliant edge is capable of substantially recovering size and shape after deformation. The truck fairing can comprise a tray positioned under the truck beam, a rigid portion on the tray and at least one compliant edge on the tray.

More specifically, FIGS. 7A through 7E show views of a truck beam, with a fairing 1210 disposed under the truck beam. The fairing 1210 can be comprised of fairing sections 1214, 1216, 1218 that cover the underside of the truck, brake rods and brakes, with a fourth section 1220 secured proximate to the tow fitting to cover the forward truck, tow fitting, jacking pad, and front brakes.

A compliant edge 1250 can comprise nylon or other suitable type of bristles, proximate to the tires 13, brakes 22, wheel hub 42 and wheels 12. The bristles can be attached through riveting strips 1252 or other suitable connectors. Alternatively, the compliant edge 1260 can comprise soft rubber or other elastomeric polymer. The compliant edge further can be made of a material that is inert, chemically resistant and/or heat resistant.

In one embodiment, the edge is constructed of a molded plastic or thermoplastic polyolefin such as Dexflex® 880 made by D & S Plastics International Partnership of Grand Prairie, Tex.

Figure 7E:
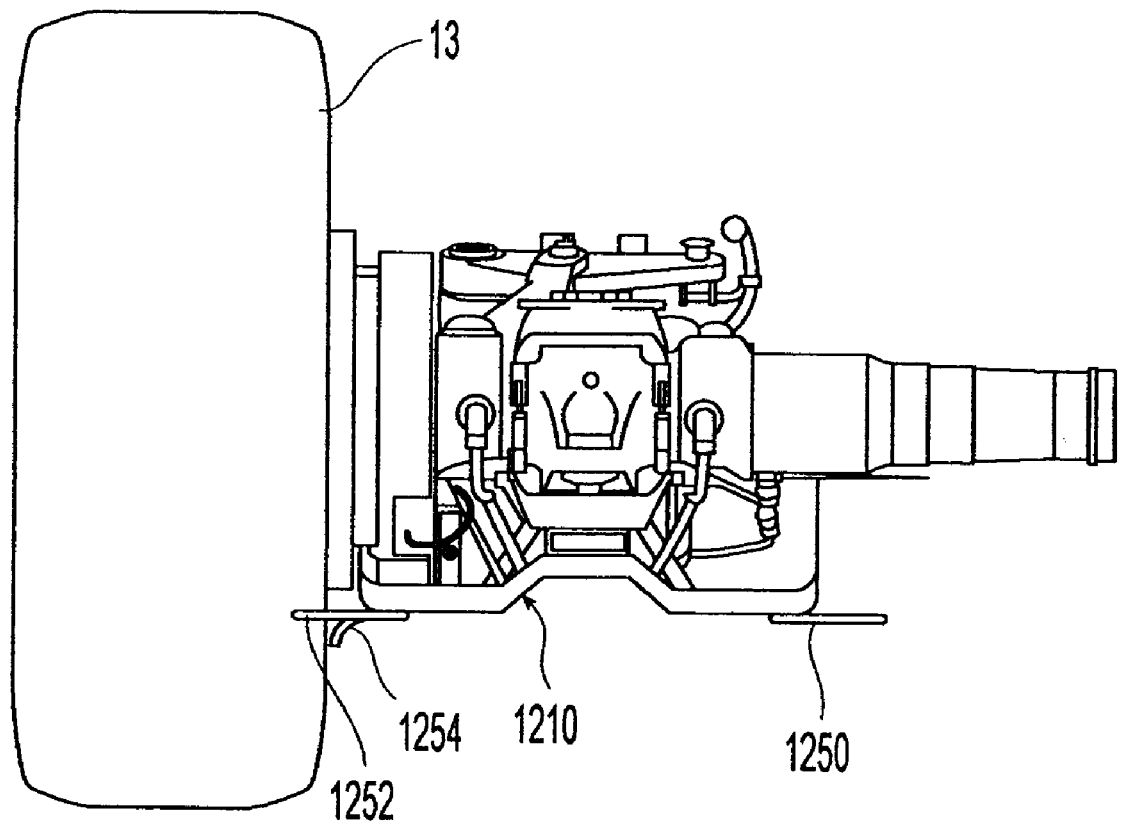

FIG. 7E shows the fairing 1210 with a compliant edge 1250 in a view looking aft. In this view, some of the compliant bristles 1252 are in front of the tire, and not deflected, while other bristles 1254 are shown as being deflected as a result of the tire contacting the bristles 1254 of the compliant edge 1250.

Figure 8:
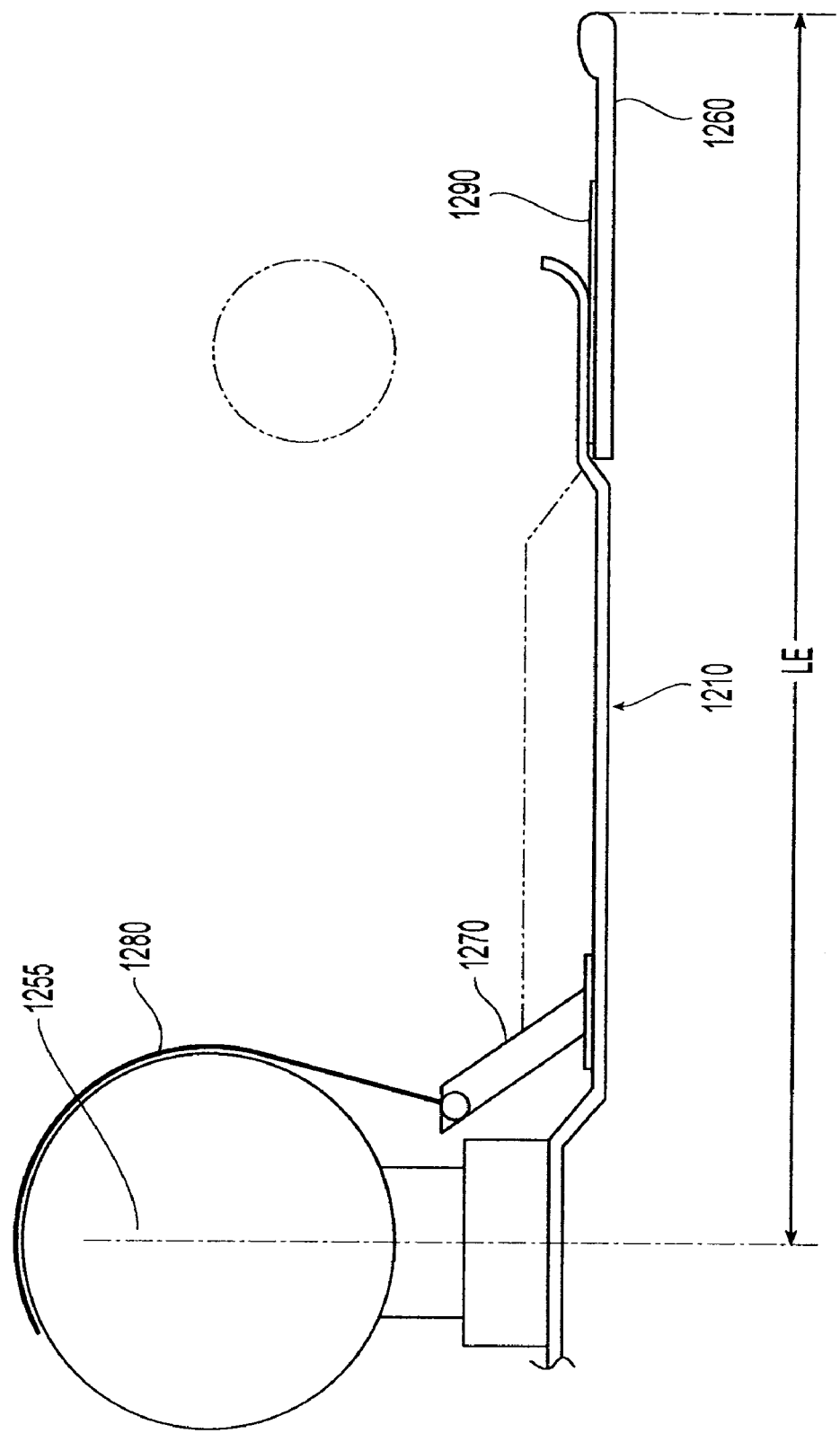
FIG. 8 is an exploded view of a compliant edge of a truck fairing of the present invention.

FIG. 8 shows an exploded view looking aft of the fairing and landing gear where the fairing 1210 has a compliant edge 1260. The rigid portions (such as sections 1220, 1218, 1216 and 1214 shown in FIG. 7B) of the fairing 1210 can be made of rigid metallic or composite materials, and are mounted about the truck bogie beam 18 with a support arm 1270, and arch 1280, as shown in FIG. 8. A bias member 1290, which can be in the form of spring steel or other suitable materials, can be provided and is mounted to a rigid portion of the fairing 1210, as shown in FIG. 8. A compliant edge 1260 can then be connected to the bias member 1290 and fairing 1210. The compliant edge 1260 can be made of rubber, such as Dexflex® 880. In one embodiment, the compliant edge can be located a distance LE from the gear centerline 1255. In an embodiment suited for the Boeing 777 aircraft, for example, the distance LE can be from about 12 to 17 inches, and preferably about 15 inches, and most preferably about 14.9 inches. The rigid portion can have a width of about 24 inches, or preferably about 23.8 inches.

Figure 8A:
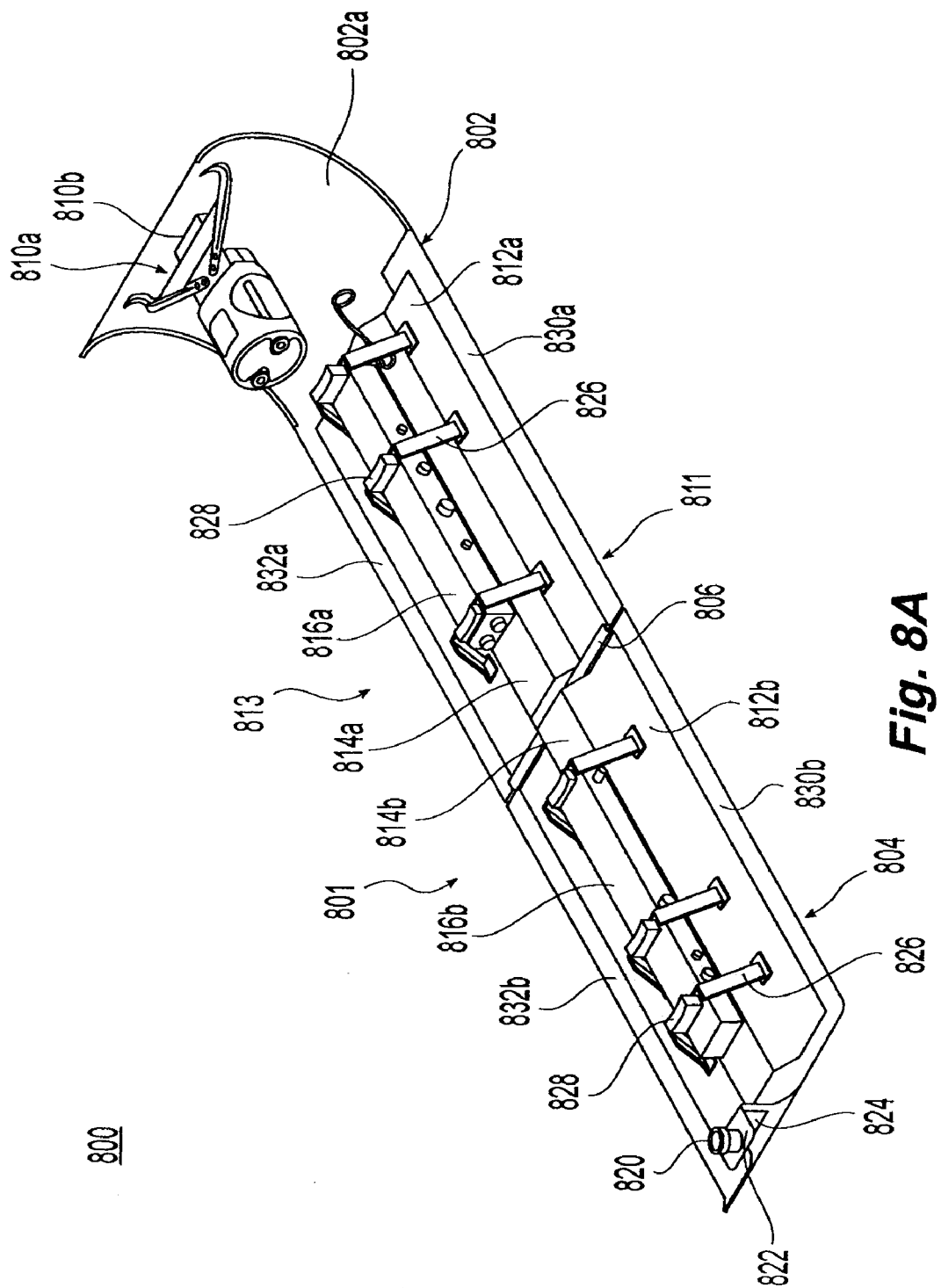
FIG. 8A is a view of another embodiment of a truck fairing with a compliant edge in accordance with the present invention.

FIG. 8A shows another embodiment of a toboggan-type truck fairing 800. Fairing 800 includes an elongated body 801 connected to a rising forward portion 802A that preferably is curved. The elongated body 801 has lateral side edges 811, 813 to which are affixed compliant edges, discussed further below.

The fairing 800 includes a rigid forward panel assembly 802 that is adjacent to the curved forward portion 802A. The fairing 800 also includes a rigid aft panel assembly 804 which preferably has the same width as the forward assembly 802. Thus, fairing 800 can comprise a plurality of fairing sections. The forward and aft assemblies 802, 804 can be formed of metallic or composite materials. In the case of metallic materials, they may be formed of aluminum. In the case of metallic materials, they may be formed of aluminum. In one embodiment, the forward assembly 802 and the aft assembly 804 are unconnected to one another. They are mounted to respective forward and aft portions of a truck or bogie beam 18 and/or other parts of the landing gear, and are separated by a center seal 806, described below. The underside of the fairing 800 preferably is flat, in contrast to truck fairing 210.

The front assembly 802 further comprises a forward panel support assembly 810A including a mounting bracket 810B for mounting to the inside surface of the curved forward portion 802A. In addition, the front assembly 802 includes a forward upper shield plate 812A having a raised medial surface 814A, and an aft junction box 816A atop a portion of the raised medial surface 814A.

The aft assembly 804 includes an aft upper shield plate 812B having a raised medial surface 814B, and an aft junction box 816B atop a portion of the raised medial surface 814B. The far aft end of the aft assembly 804 is provided with a pin 820 atop a rearwardly projecting fin 822 belonging to an upstanding support 824.

Also, at spaced intervals along the length of the forward and aft junction boxes 816A, 816B, respectively, are shield supports 826 and braces 828.

As seen in FIG. 8A, a center seal 806 extends in a direction transverse to the elongated body 801 and along at least a portion of the width of the fairing 800 separates the forward assembly 802 from the aft assembly 804. As seen in FIG. 8B where the compliant edges 830a, 830b, 832a, 832b have been removed, the center seal 806 preferably is formed from a flexible, compressible elastomeric material. As shown in FIG. 8c, the center seal 806 can comprise a generally rectangular body portion 806a having a longitudinally extending hollow aperture 806b, and a downwardly extending tongue portion 806c connected to the top region of the body portion 806a and extending in a direction parallel to a proximate sidewall of the body portion 806a.

As seen in FIGS. 8c and 8d, the rear end of forward assembly 802 and the front end of the aft assembly 804 can be provided with upturned flanges 808a, 808b, respectively. In one embodiment, the flange 808b is secured to the center seal 806 at the tongue portion 806c. This is done by adhesive or by riveting, although other techniques may also be employed.

When the aircraft is on the ground (the 'loaded' condition), the flanges 808A, 808B of the aft assembly 802 and forward assembly 804, respectively, are separated by a first distance D1, which is approximately 1.2-1.6 inches. In this condition, the center seal 806 is spaced apart from the flange 808a so that there is no contact therebetween. On the other hand, when the aircraft is in the air, the flanges 808a, 808b of the aft assembly 802 and forward assembly 804, respectively, are separated by a lesser, second distance D2, which is approximately 0.8-1.0 inches. In this condition, the center seal 806 abuts the flange 808B of the forward assembly and the center seal 806 is slightly compressed. It can therefore be seen that there is a difference in separation between the forward and aft assemblies, depending on whether the aircraft is in flight, or on the ground. It is further understood while in the embodiment described above, the center seal 806 is secured to the flange 808a of the aft assembly 804, one may instead secure the center seal 806 to flange 808b of the forward assembly 802.

As also shown in FIG. 8a, the fairing 800 is provided with four compliant edge portions 830. A first pair of these, 830a, 830b, are provided on the first lateral edge 811 of the elongated body 801, while a second pair 832a, 832b are provided on the second lateral edge 813. Thus, each lateral edge 811, 813 comprises adjacent portions the forward assembly 802 and the aft assembly 804 on one side of the elongated body portion 801. Furthermore, each lateral edge 811, 813 is provided with a compound compliant edge that comprises a pair of separate compliant edge portions adjacent to one another.

FIGS. 8i and 8j show the compliant edge in the foreground and omit the central seal, but otherwise are similar to FIGS. 8c and 8d. As seen in FIG. 8i, when the aircraft is on the ground, the adjacent forward and aft compliant edges 830a, 830b, respectively, on the same side of the fairing 800 are spaced apart from one another, due to the increased separation experienced by the forward and aft assemblies 802, 804, discussed above with respect to FIG. 8c. Preferably, the opposing ends of adjacent forward and aft compliant edges are angled at complementary angles, such as about 45 degrees, so as to form angled abutments 870a, 870b when in the unloaded condition.

And as seen in FIG. 8j, when the aircraft 800 is in the air, the forward and aft assemblies 802, 804 are closer to one another and the adjacent forward and aft compliant edges 830a, 830a on the same side of the fairing 800 to abut one another at abutments 870a, 870b. The angled cut at the abutment interface helps prevent excessive deformations at the end due to misalignment when the adjacent compliant edges meet.

As seen in the cross-sectional view of FIGS. 8e and 8f of either the front or aft assembly, 802, 804, the fairing 800 comprises lower shield plates 834a, 834b opposing corresponding upper shield plates 812a, 812b. Preferably, the upper shield plates are formed from aluminum having a thickness of about 0.1 inches, while the lower shield plates are formed from aluminum having slightly less thickness, on the order of about 0.063 inches thick. It is understood that other thicknesses of aluminum, and even other materials, may be used.

As seen in FIG. 8f, the elongated gripping portion 838 of the compliant edge 830 is inserted between the upper shield plates 812a, 812b and the lower shield plates 834a, 834b and secured to these by fasteners 840. A weight bearing spacer 836 is positioned inward of the gripping portion 838, between the upper shield plates 812a, 812b and the lower shield plates 834a, 834b. The spacer 836 is located below the support 826 and thus serves as a weight-bearing element, thereby preventing the elongated gripping portion 838 of the compliant edge 830 from being crushed between the upper shield plates 812a, 812b and the lower shield plates 834a, 834b. Preferably, the spacer 836 has a thickness between about 0.2 to about 0.3 inches, and more preferably is 0.25 inches.

As seen in FIG. 8g, the projecting portion 840 of the compliant edge has a length D3, which preferably is between about 2 to about 4 inches and more preferably is about 3 inches. The compliant edge's tip portion 842 is angled slightly upwardly, relative to the remainder of the compliant edge. The length D4 of the tip portion 842 is preferably between about 0.75 and about 1.25 inches in length, and more preferably is about 1 inch. Furthermore, the tip portion 842 preferably is angled upwards between about 10° to about 30°, although amounts outside this range may also be effective.

In one embodiment, as shown in FIG. 8g, the compliant edge 830 has a two-ply polyester/fiberglass reinforced core 844 in areas away from the gripping portion 838 and a four-ply polyester/fiberglass reinforced core 846 in the gripping portion 838, especially in those areas proximate to the fasteners 840. Surrounding the cores 844, 846 is an elastomeric material 848 which gives the compliant edge 830 its shape. The elastomeric material 848, in turn, is covered with a knit cover 850 to provide a smooth surface finish. In one embodiment, the knit cover 850 is formed of Dacron®.

Preferably the core 846 comprises a polyester/fiberglass reinforced cloth. The stiffness of the compliant edge in a widthwise direction may be varied by changing the number of layers of the polyester/fiberglass reinforced cloth. To prevent excessive wear and/or damage, a 2-ply construction is preferred in areas of the compliant edge that are proximate to the tires while a 4-ply construction is preferred in areas away from the tires to provide enhanced greater stiffness.

FIG. 8h shows an alternative embodiment of a compliant edge 860 in which the tip portion 862 is not angled, the compliant edge 860 being similar in construction to compliant edge 830 seen in FIG. 8g.

Under normal operating conditions, whether on the ground or in the air, the compliant edges 830, 850 are not intended to be deflected by brushing against the tires and/or wheels, as are bristles 1254, discussed above with respect to FIG. 7E. Thus, no tire/wheel rub is expected with compliant edges 830, 850.

Figure 9A:
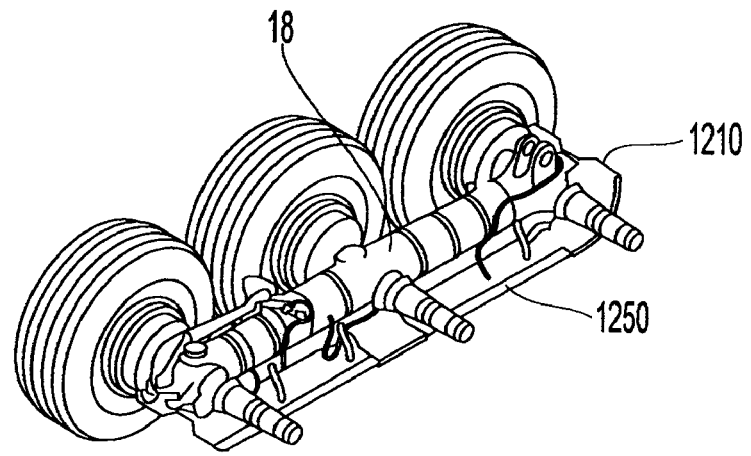
FIGS. 9A through 9C are views of a truck fairing of the present invention.
Figure 9B:
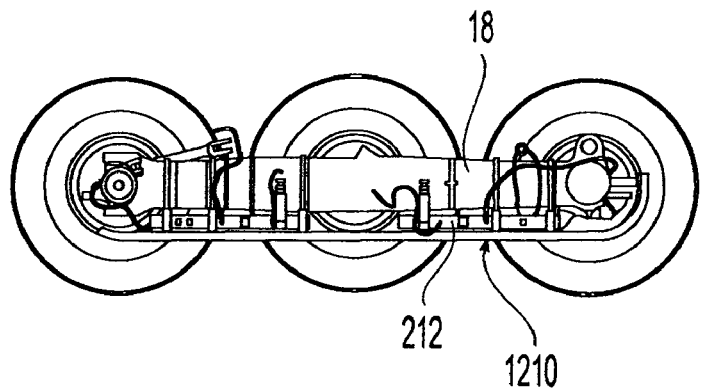
Figure 9C:
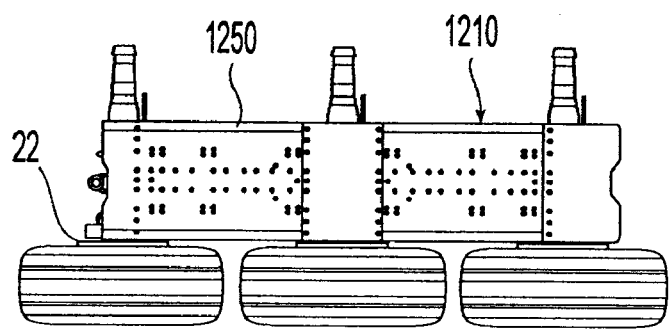

FIG. 9A through 9C show further views of a fairing 1210, with the compliant edge 1250 installed. In an embodiment suited for the Boeing 777 aircraft, the fairing 1210 can be attached to the main truck beam 18 with fittings common to an electrical box 212, which can house various cabling and wires used in the landing gear. The fairing 1210 replaces a gravel shield (not shown) on the current Boeing 777 design used to protect the electrical box. In the embodiment shown, the clearance between the fairing and the brake disks 22 is about 0.4 inches.

A truck fairing 1210 with a compliant edge 1260 in accordance with this invention allows the fairing 1210 to fit in close proximity to the landing gear tire 13. Noise tests have demonstrated that noise reduction is a function of the distance between the fairing and edge of the tire, with fairings that minimize the gap between the fairing edge and the tire performing well. This relationship was demonstrated during wind tunnel testing of a landing gear with no fairing, a landing gear with a narrow width truck fairing, and a landing gear with a maximum width fairing. Under wind tunnel test conditions equivalent to an aircraft landing approach velocity, a flyover angle of incidence and a truck angle of 13 degrees toe up, the noise levels consistently decreased at numerous frequencies as the fairing width increased.

While test have demonstrated that a wide truck fairing is beneficial, the integrity of a fairing structure may be at risk if the fairing is too close to the tires. Aircraft tires can deflect under landing loads and ground maneuvering. Hence, even if a clearance between the tires and fairing exists when the aircraft is at rest, this clearance can be reduced to zero when the aircraft is maneuvering. The most extreme deflections occur when an aircraft has a maximum load, such as when an aircraft is fully loaded with fuel, passengers and cargo for take-off. Under such loads, the aircraft may have to pivot about its main gear, leading to tire deflection. These deflections are increased if the main gear steering is not used. The specific design parameters for the truck fairing and compliant edge will be dependent upon the landing gear and amount of tire deflection anticipated and/or measured. The width of the fairing and associated compliant edge can be maximized, but preferably not so wide as to contact the tire or wheels during normal taxiing, take off, landing or normal ground maneuvering while the tire may be turning at high speeds. Preferably the compliant edge does not contact the tire under such conditions in order to avoid tire wear. The extreme maneuvering conditions where contact occurs with the tire and compliant edge should occur seldom and should not contribute to excessive tire wear because of the low incidence of occurrence and the low rotational speeds of the tires under such extreme conditions.

A truck fairing with a compliant edge allows the fairing to block or limit air flowing through or around the edge while at the same time being flexible enough to deflect during extreme ground maneuvering or even tire rupture. The compliant edge can be comprised of rubber or fabric stripping, fiber reinforced rubber, nylon brush, spring steel or an inflatable bladder, and other equivalent structures. Such compliant edges allow for proper functioning of a noise attenuator, while minimizing any adverse effects of tire rub. Although in the embodiments shown, the compliant edge is provided only in proximity to the tires, the compliant edge can extend the entire edge of the fairing proximate to the tires. Such an embodiment would allow for forward-aft adjustments, and possibly provide a universal fit for multiple landing gear configurations.

Figure 10:
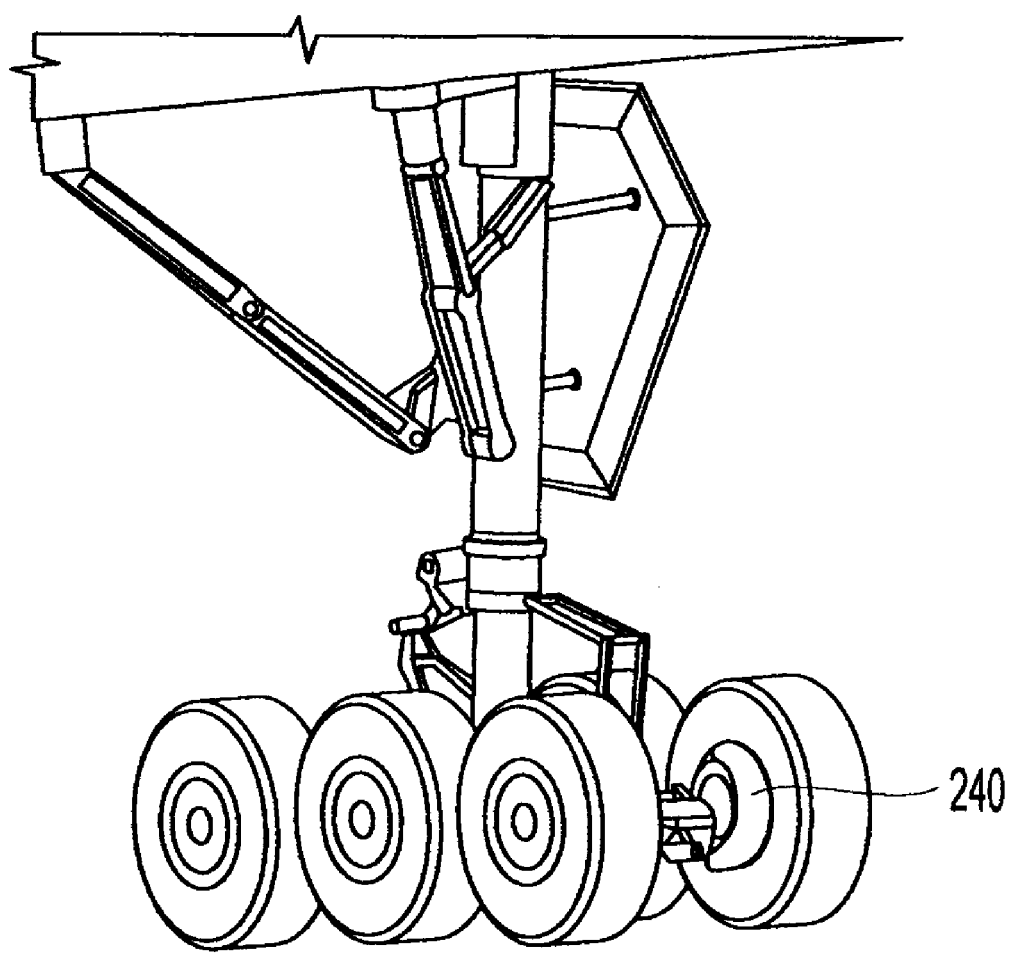
FIG. 10 is a brake fairing of the present invention.

FIG. 10 illustrates a fixed brake cover fairing 240. Fairing 240 streamlines the airflow over the brakes by partially covering the piston and piston housing of the front brakes. The less than full circumferential design of the fairing 240 promotes cooling to minimize the effect of the fairing on brake performance and to promote brake cooling while the aircraft is parked at the gate.

Alternatively, the fairing 240 may also incorporate smart fairing components that retract out of the way while the aircraft is on the ground to facilitate brake cooling. The design of fairing 240 may also incorporate brake cooling ducts to help decrease the time required for brake cooling.

In addition, or in the alternative, to a separate brake cover fairing 240, a brake fairing concept can be incorporated into the lower truck fairing design 210. As shown in FIGS. 6A and 6B, the truck fairing 210 partially covers the front brakes on the landing gear. The fourth piece 220 of the truck fairing can be secured to the tow fitting and cover the front brakes on landing approach.

Figure 11:
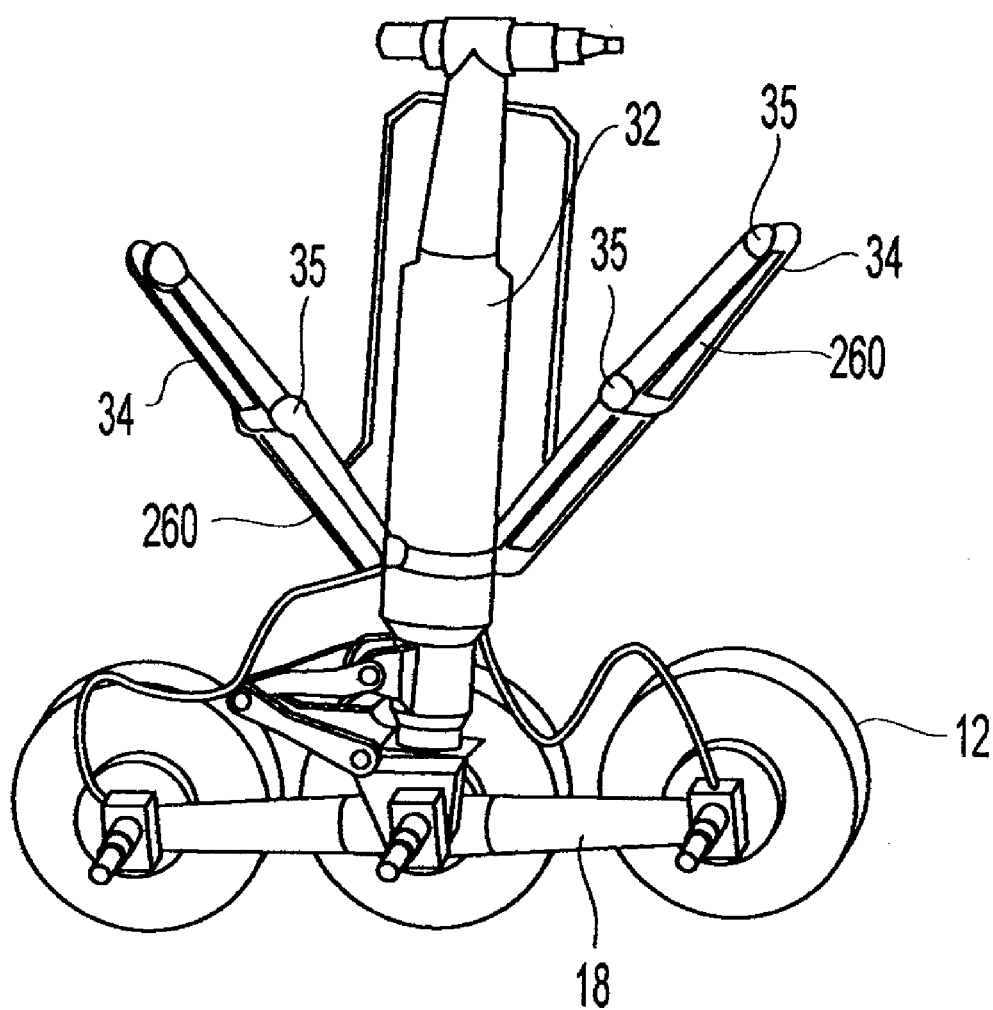
FIG. 11 shows structural fairings of the present invention.

FIGS. 11 through 12 illustrate fairings used to minimize noise emanating from cavities and pockets in structural members. These fairings 260, 264 provide aerodynamic shapes to the braces 34 of the landing gear to reduce wakes generated by the braces, as well as filling in open ended pins. "Pocket filler" fairing inserts 260 can comprise low weight foam material, plastic, composite and/or metal alloy insert. The use of plastic and/or metal (such as aluminum) as opposed to a foam insert increases weight, but may be easier to attach to the structure and decreases the concern for possible foreign object and debris damage.

Fairings 260 can also comprise acetal resin inserts, such as Dupont's Delrin® resin, that fit inside the pockets of the side and drag braces. These inserts can be restrained to the braces using existing attachment slots in the pockets. The shallow pockets on the sides of the braces do not necessarily require inserts, only the deeper pockets on the top and bottom of the braces. End caps also can be installed in hollow pins 35 about the gear. Known manufacturing practices can be utilized to manufacture the filled braces.

Figure 12A:
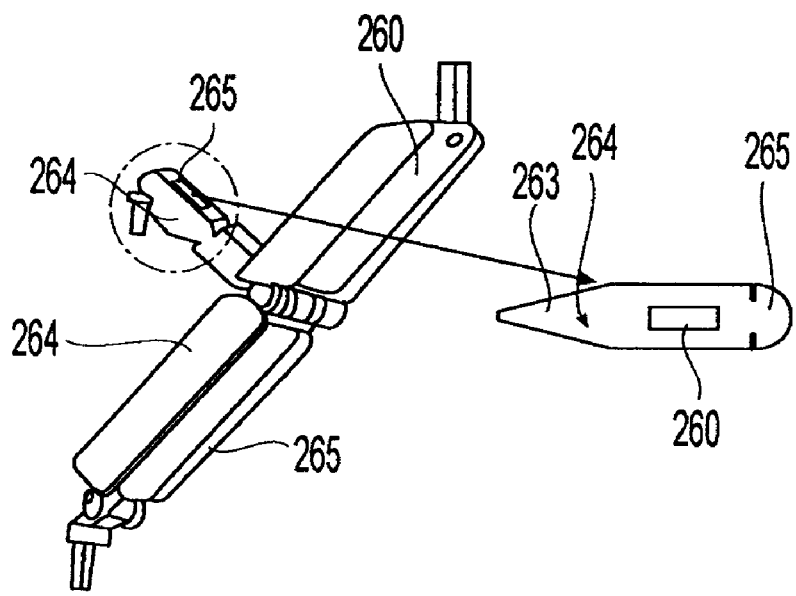
FIGS. 12A and 12B show structural fairings of the present invention.
Figure 12B:
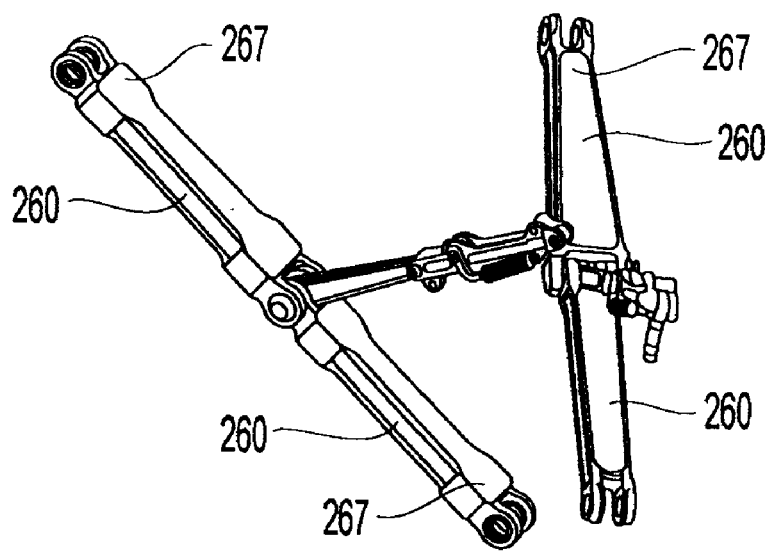

As shown in FIG. 12A, fairing 264 can be designed to have a bulbous front section 265, and a tapered rear section 263, to help minimize noise generation.

The "pocket filler" fairings 260 can be designed to allow for ease of installation and removal. As shown by the filled brace pockets of FIG. 12B, installation can be by traditional removable or non-removable fasteners 267. Alternatively, in new construction, the braces can be fabricated without any pockets or cavities. When removable fasteners 267 are used, the fasteners 267 allow ease of removal of the fairings for inspections for potential cracking and corrosion of the structural members underlying the fairings, as well as inspections for moisture that may collect between the fillers and structural members.

Figure 13A:
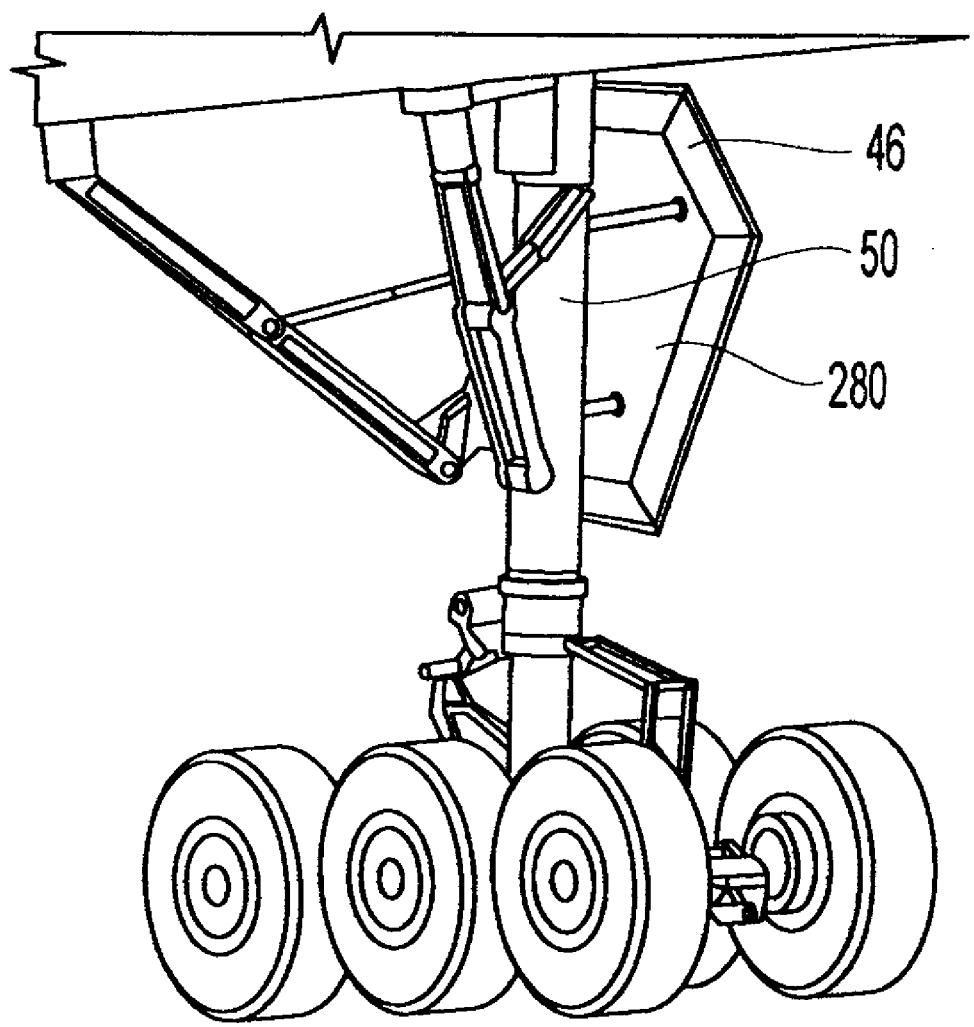
FIGS. 13A and 13B are door/shock strut interface fairings of the present invention.
Figure 13B:
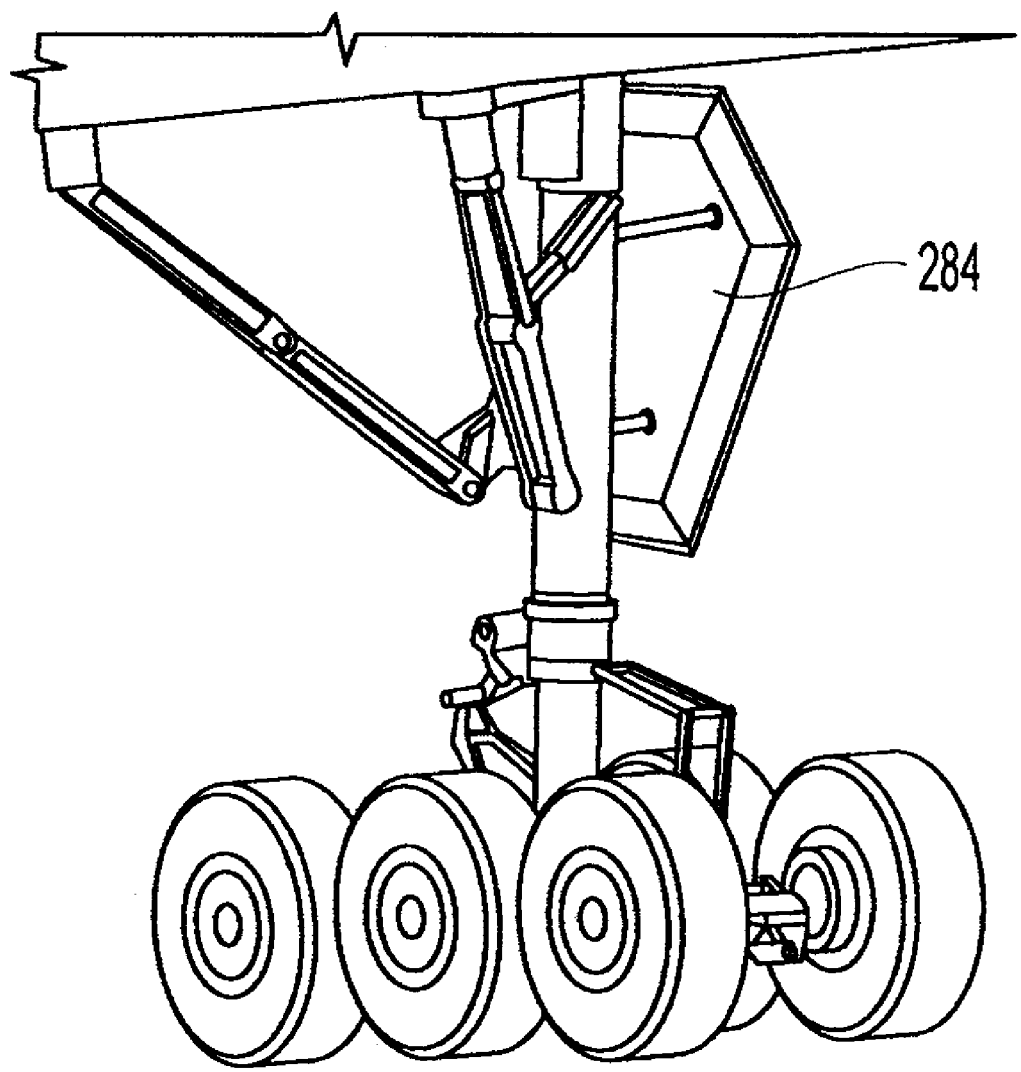
Figure 14A:
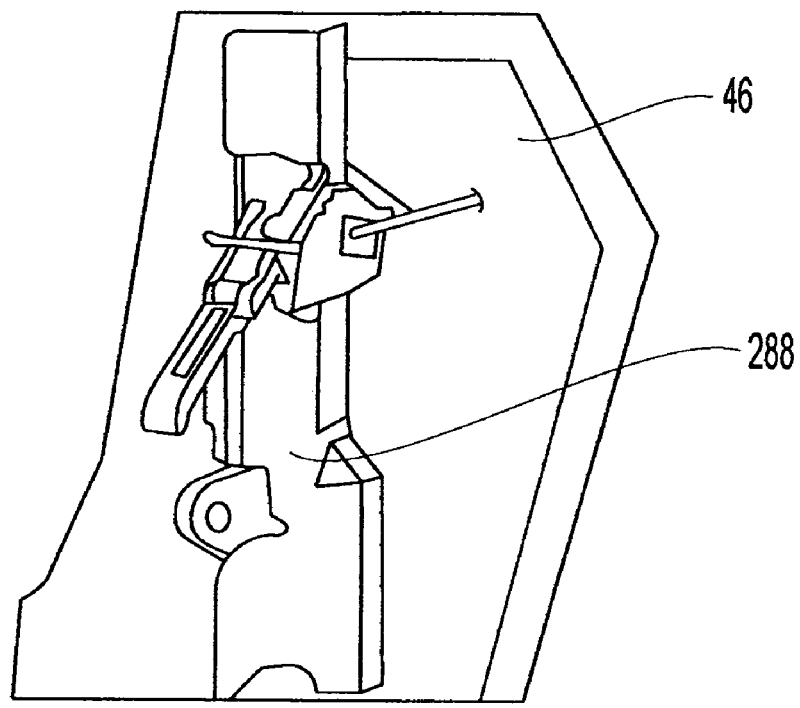
FIGS. 14A-14D are door/shock strut interface fairings of the present invention.
Figure 14B:
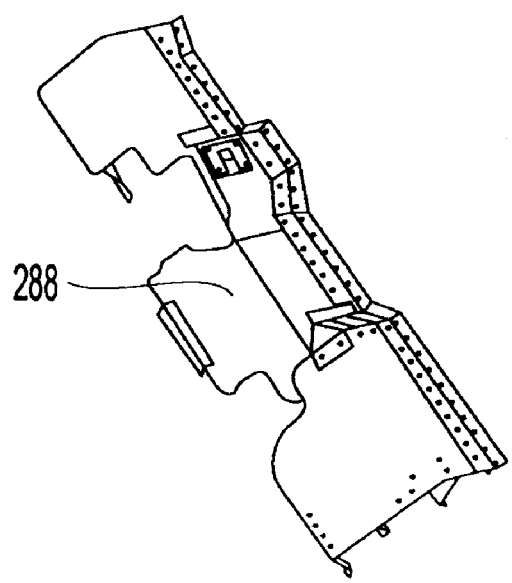
Figure 14C:
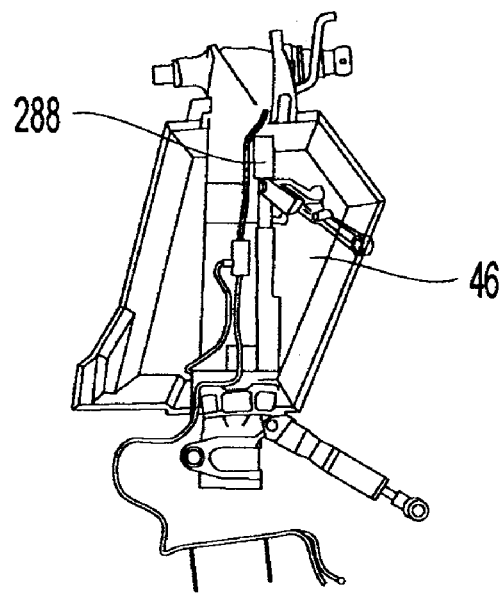
Figure 14D:
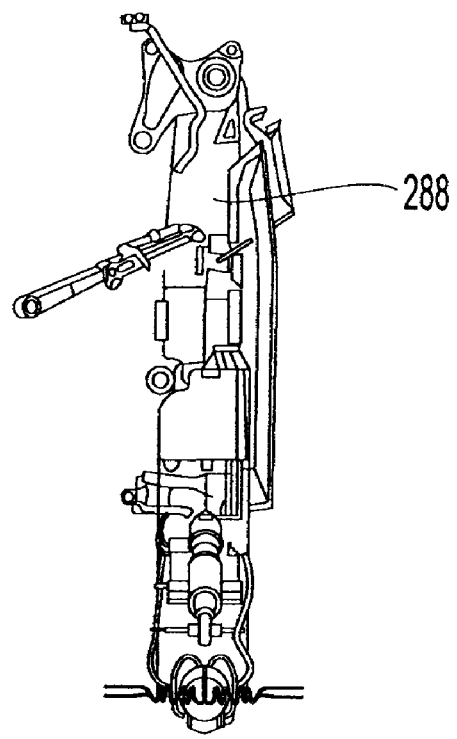

FIGS. 13 and 14 illustrate door/shock strut interface fairings. These fairings reduce noise by eliminating the gap between the door 46 and strut 50. In the case of fairing 280, the gap is eliminated by making modifications to the edges of the door shape, and inserting a fairing 280 in the gap between door and the strut. As shown in FIG. 13B, a fairing 284 can be attached to the door or shock strut.

In another embodiment, as shown in FIGS. 14A-14D, a door/strut interface noise reduction fairing 288 comprises a multi-piece fairing that attaches to the shock strut via the existing hydraulic and electrical brackets along its length. The fairing extends from the door around the front of the shock strut and around the side of the gear, incorporating the shock strut concept. The door to shock strut and systems fairing can be made of aerospace grade aluminum alloys; alternatively, other materials including composite structures may be used.

Figure 15:
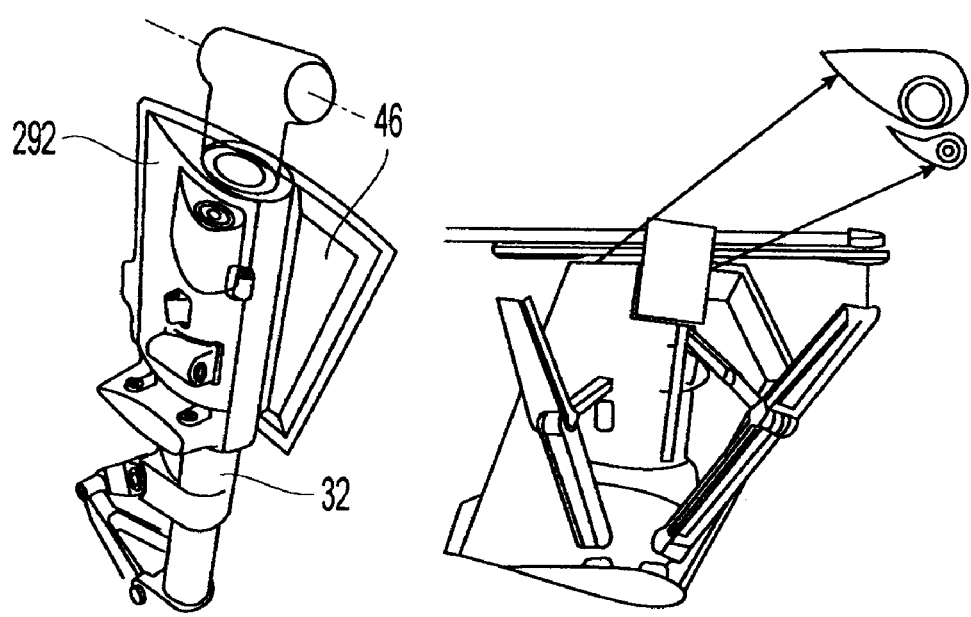
FIG. 15 is a shock strut fairing of the present invention.

FIG. 15 shows a tear drop shock strut fairing 292 that extends from the interface gap around the front of the shock, covering the electrical and hydraulic lines that run along the front of the shock strut. Such a fairing can be added as a retrofit to an existing strut, or incorporated into a design of a new landing gear strut. During operation, the shock strut fairing 292 is designed to allow the shock strut to function both in the deployed but pre-touchdown position, and also in the post-runway, compressed position. This function is permitted by the fairing internal construction allowing for sufficient clearance for compression of the shock strut when the landing gear contacts the runway or ground surface during landing. The attachment points of the fairing 292 also avoid interference with such shock strut compression.

The fairings as described herein can be installed and removed, ideally, by a single individual. Sharp edges on the fairing should be avoided in order to avoid creating safety hazards. Benefits for these fairings may include a reduction in the size and weight of the dressings that these fairing would protect. In addition to aiding noise reduction, the fairings of this invention may also act as a foreign object and debris deflector, reducing the need to increase the material size of the dressings that the fairings protect.

In another embodiment, a deployable fairing can operate to deploy upon extension of the landing gear, and then retract when the landing gear is stowed within the nose section and wing sections. A landing gear fairing, for example, can inflate when the landing gear is deployed, and deflate when the fairing is not required or desired.

Figure 16A:
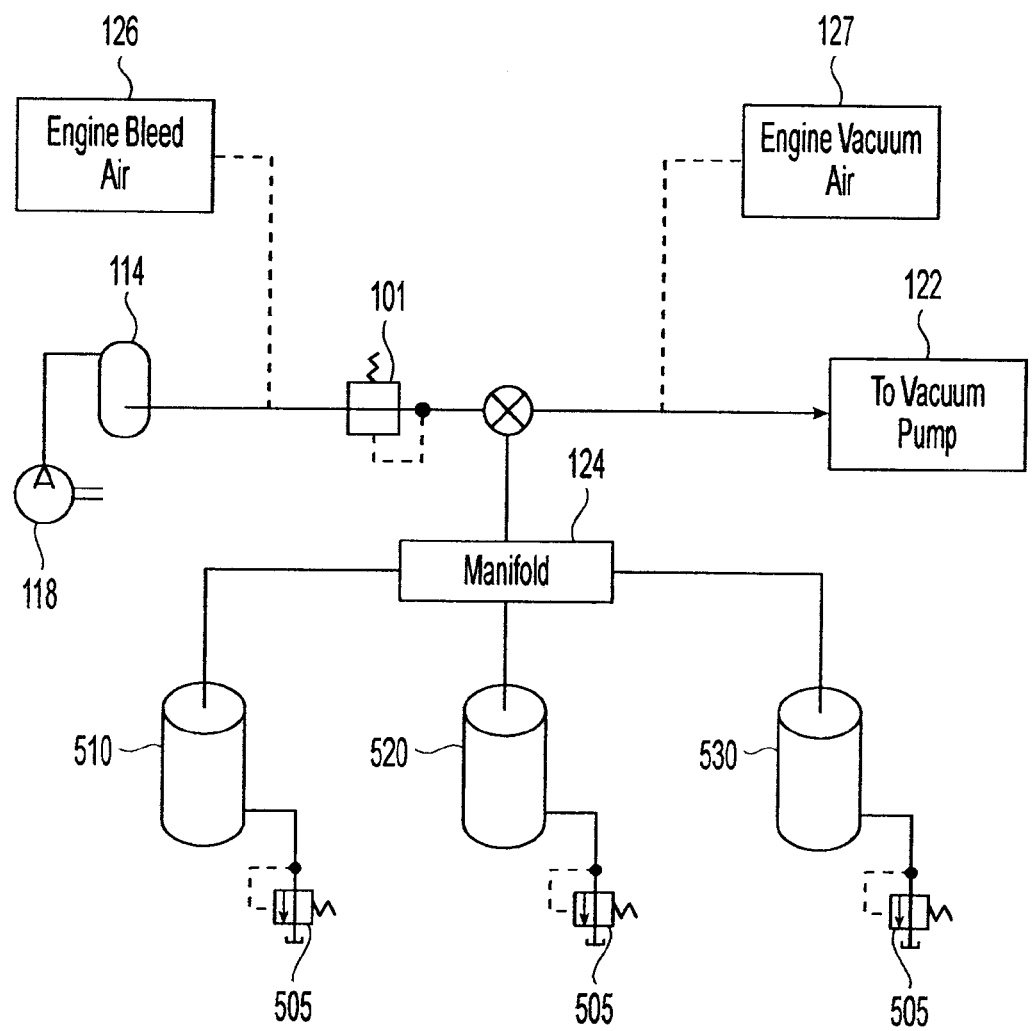
FIG. 16A is a system diagram of the components for inflatable fairings of the present invention.

As shown in FIG. 16A, the deployment and retraction of the inflatable fairings preferably is achieved through air pressure actuation and retraction. When the landing gear is deployed, a pressure regulator 101 can be triggered to inflate the fairings 510, 520, 530 via a manifold 124, as the landing gear comes into the air stream. A 400 cubic inch reservoir 114 can be charged to approximately 2,000 psig with air to inflate the fairings. A compressor 118 can charge the reservoir 114 to approximately 2,000 psig pressure. A vacuum pump 122 can deflate the fairings once the airplane is on the ground. The fairings can stay deflated during airplane takeoff. The vacuum applied to the fairings can keep the fairings from excessive movement or flapping in the air during takeoff. Alternatively, bleed air 126 from the engine can be used to charge the reservoir and an engine vacuum device 127 can apply a vacuum pressure thereby eliminating the need for a compressor and vacuum pump.

Figure 16B:
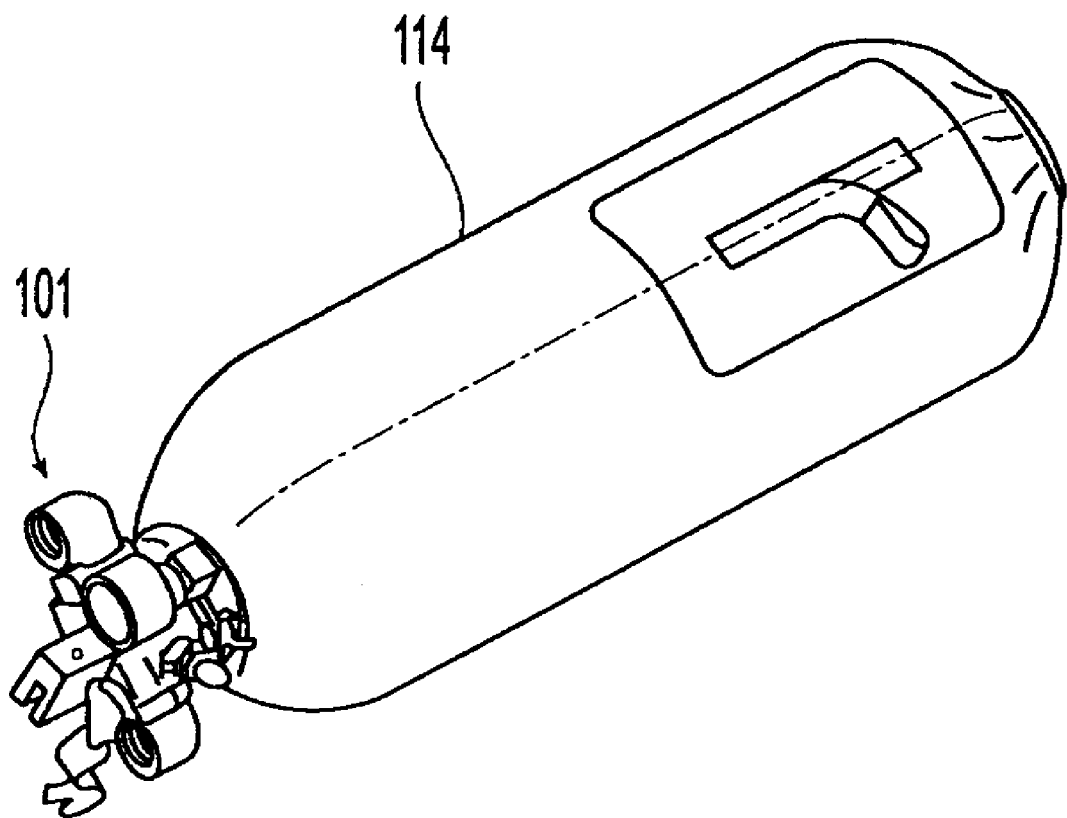
FIG. 16B is a pressure reservoir and regulator of the sort used in conjunction with FIG. 16A.

The pressure regulator 101 and reservoir 114 are shown in FIG. 16b. In one form of operation, reservoir 114 can inflate the fairings quickly, preferably within 2 to 5 seconds from the time inflation is initiated. The reservoir 114 can be any suitable size depending upon the volume of the inflatable fairings and charged to approximately 2,000 psig pressure. In one embodiment, the reservoir can have a volume of 400 cubic inches. An air compressor 118 on board the airplane can be used to charge the reservoir 114. The pressure regulator 101 controls the pressure of air flowing into the inflatable fairings 510, 520, 530. The pressure regulator 101 actuation can be triggered by the landing gear door opening mechanism. The pressure regulator 101 can be set at a predetermined setting as appropriate for the tubing and dynamics of each installation.

A compressor 118 can charge the reservoir to approximately 2,000 psig pressure so that the pressurized air can be used to inflate the noise reduction fairings at the time of landing. To keep the weight as low as possible, the compressor preferably is a low displacement type, high pressure device that is capable to charging a reservoir to 2,000 psig while the airplane is airborne. If bleed air from the engine can be use to charge the reservoir, the need for the air compressor will be eliminated.

Figure 19:
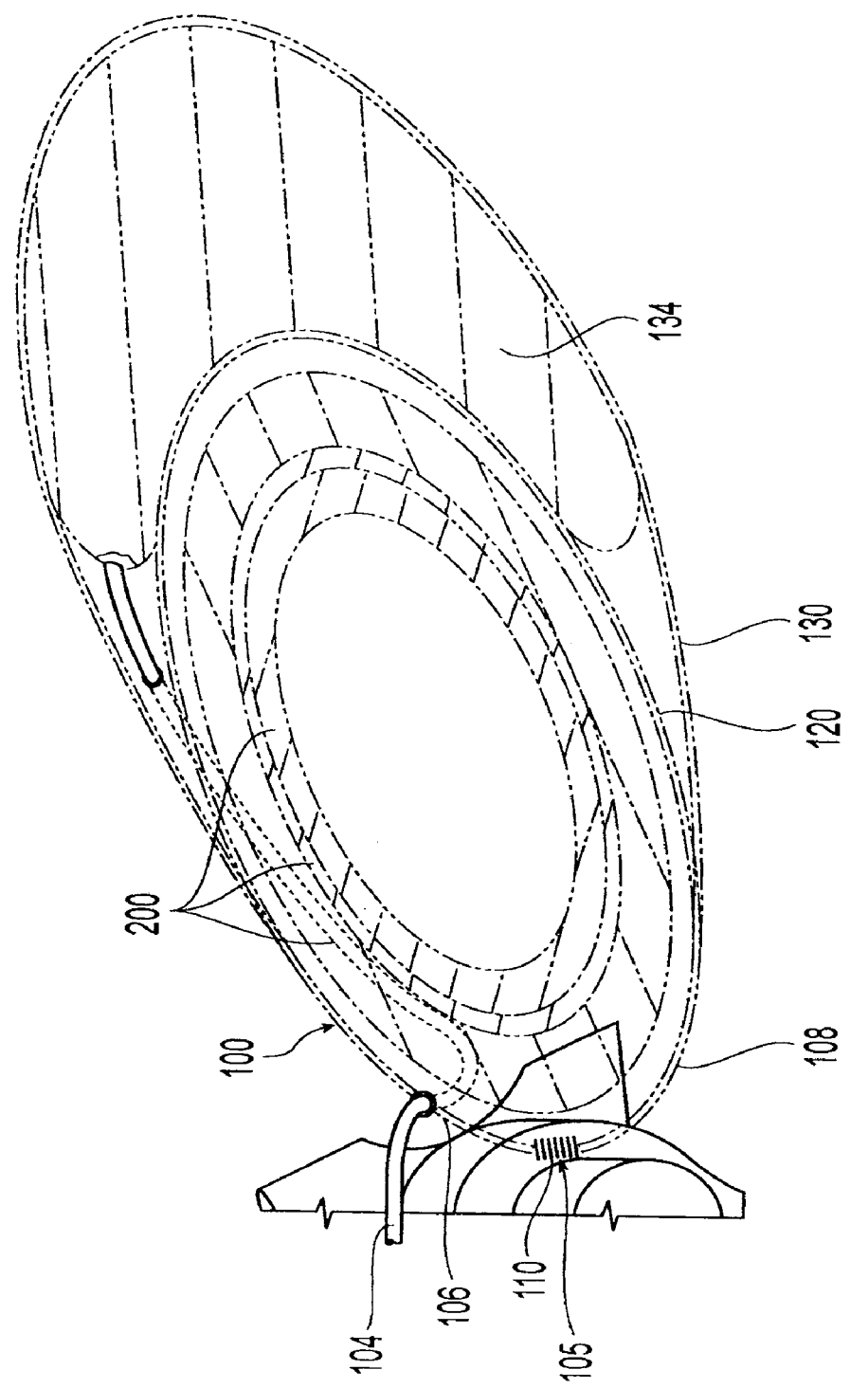
FIG. 19 is a section view of an inflatable fairing and girt of the present invention.
Figure 25:
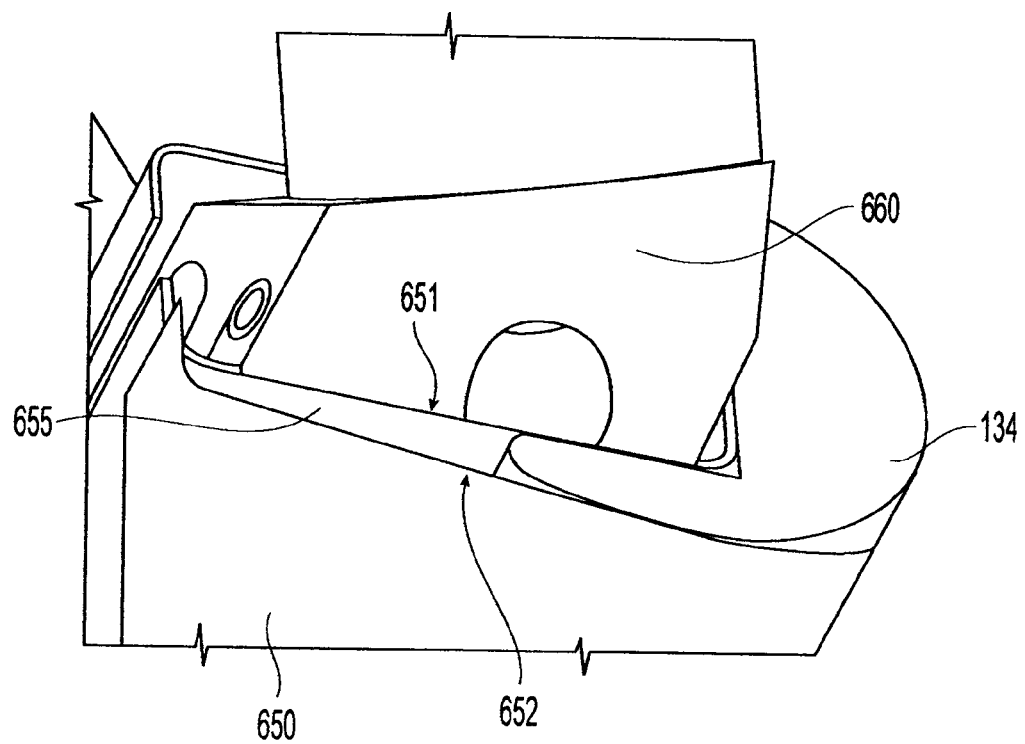
FIG. 25 is a sectional view of a drag strut fairing of the present invention.

A vacuum pump 122 can be used to remove air out of the inflated fairings once the airplane has landed. In most cases, the fairings can stay deflated during airplane takeoff. The vacuum applied to the fairings will keep them from moving or flapping in the air during takeoff. Maintaining the fairings in their deflated condition during takeoff also will better facilitate the articulation and movement of the landing gear struts during the gear stowage operation. If a bleed air ejector valve can be used to provide vacuum, the need for a vacuum pump can be eliminated. To assure that the fairings do not exceed the maximum designed pressure, a pressure relief valve 505 can be used for each fairing. Alternatively, if the pressure can be adequately controlled by the regulator 101, the requirement for the pressure relief valves may be eliminated. High pressure hoses 104 as depicted in FIGS. 19 and 25 can be used to direct high pressure air to the inflatable fairings, as well as to deflate the fairings when desired.

Figure 17:
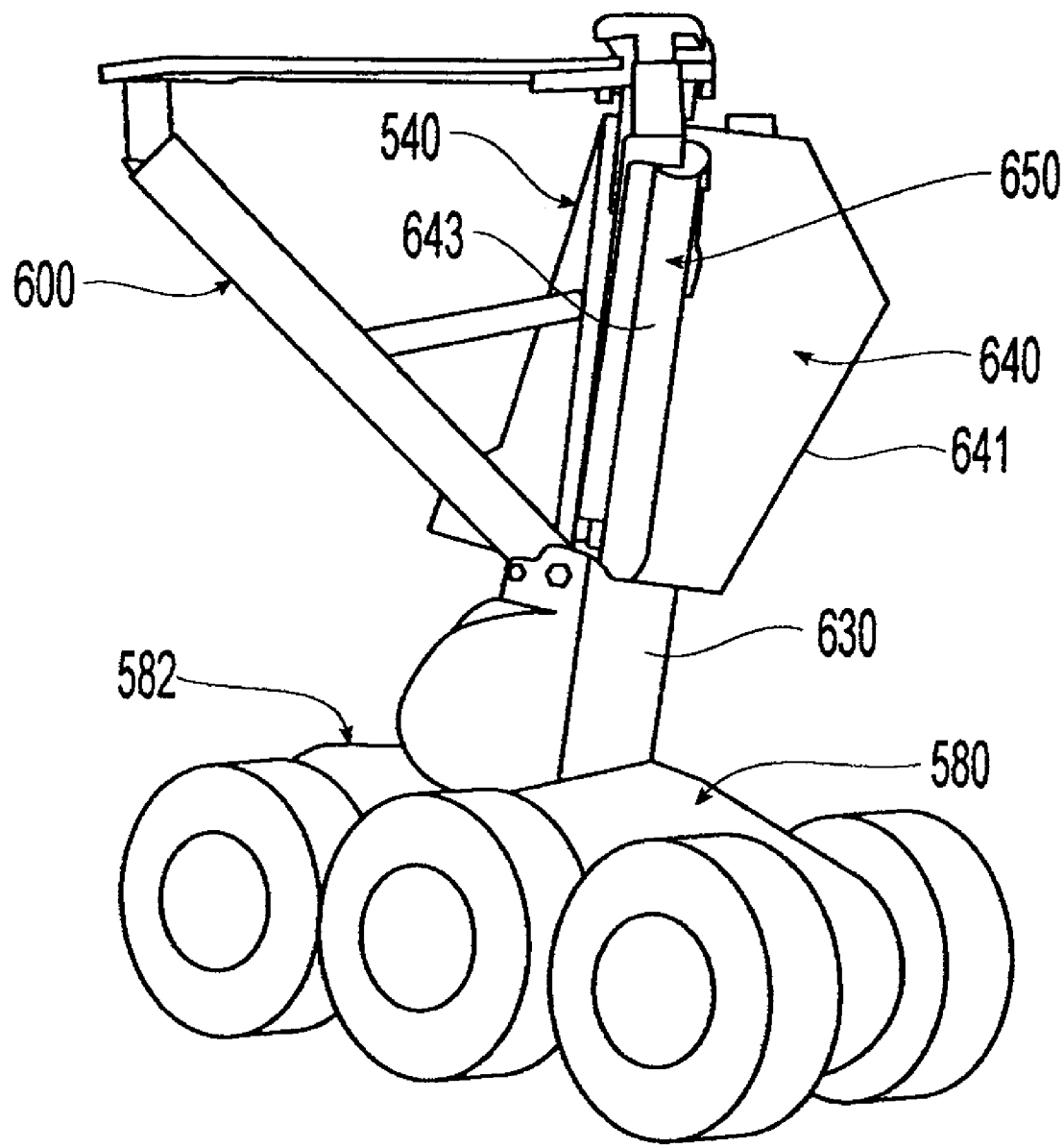
FIG. 17 is a front left view showing landing gear fairings of the present invention.
Figure 18:
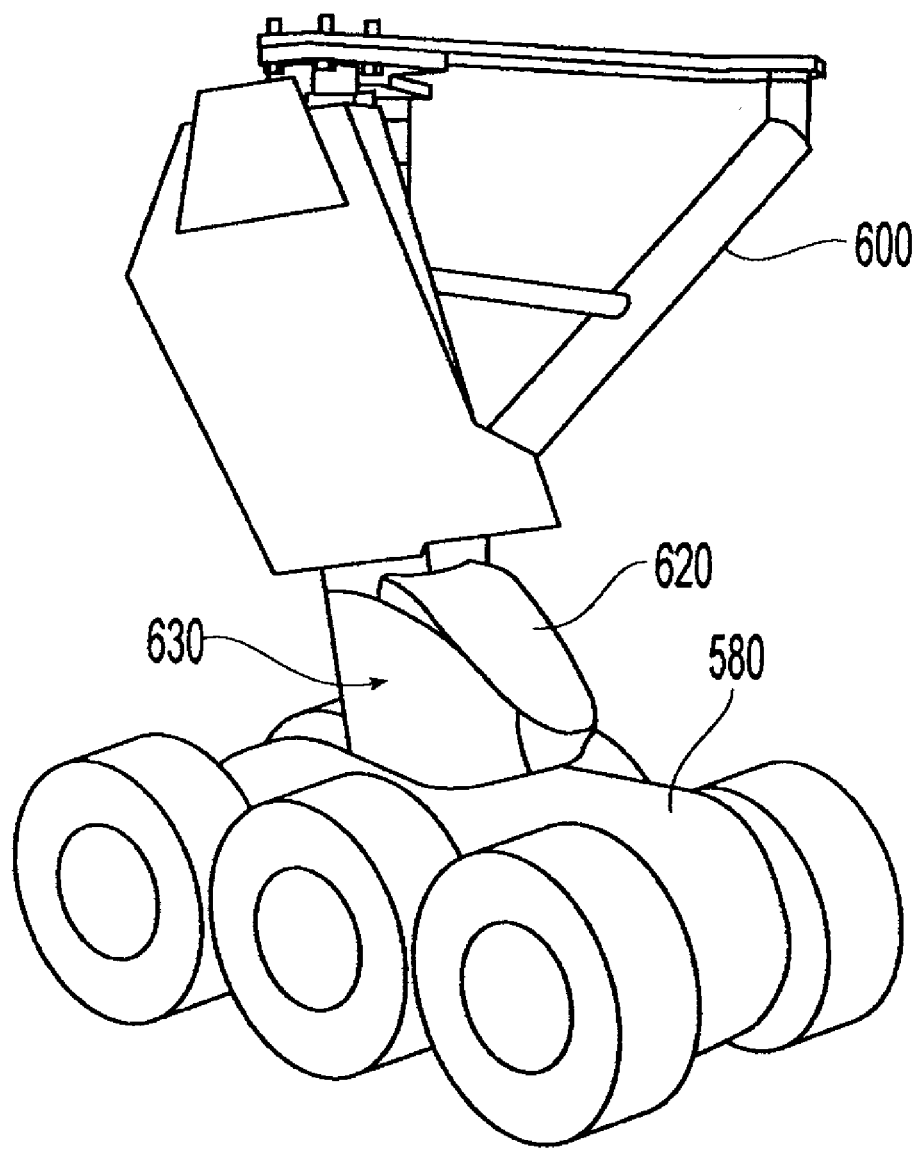
FIG. 18 is an aft view showing landing gear fairings of the present invention.

FIGS. 17 and 18 illustrate several additional embodiments for noise reduction attenuation. The deployed fairings 540, 580, 600, 620, 630, 640, 650 form an aerodynamic shape around various components of the landing gear when the fairings 540, 580, 600, 620, 650 are inflated in an embodiment to approximately 2.5 psig pressure. In the embodiments shown, a torque link fairing panel 630 and door panel fairing 640 are non-inflatable fabric panels that are deployed on, around, or between components of the landing gear and the inflatable fairings 540, 580, 600, 620, 650, which serve as deployable landing gear noise attenuators. As will be apparent to persons of ordinary skill in the art, other combinations of inflatable and non-inflatable fairings also may be used. For example, door panel fairing 640 may include an inflatable portion that at least partially fills a space between the main strut and door panel on a landing gear, and blocks or deflects noise-producing air flows that would otherwise pass between the main strut and door panel. The shape of the inflatable fairings can vary, depending upon aerodynamic or space configuration requirements.

Each inflatable fairing 540, 580, 600, 620, 650 can contain one or more inflatable chambers there within. Each inflatable chamber may require one pressure relief valve 505. The materials forming the inflatable fairings can comprise any material that is flexible and suitable for pressurization. The exterior of the fairings should be tear-resistant and capable of withstanding the environment encountered by aircraft during takeoff and landings. To minimize damage from debris impact, at least portions of some outer surfaces of the fairings can be made from Kevlar® fibers or other suitable durable fibers and material. To minimize weight, the use of high strength fibers such as Kevlar® fibers can be limited to debris impact areas only. The fairings can be secured to the structure using a girt arrangement as discussed below.

As shown in FIGS. 17 and 18, an embodiment of an inflatable fairing system may include a main strut fairing 540, a forward drag strut fairing 650, an aft drag strut fairing 600, a torque link fairing 620, a torque link fairing panel 630, a door panel fairing 640, and a truck fairing 580.

Figure 26:
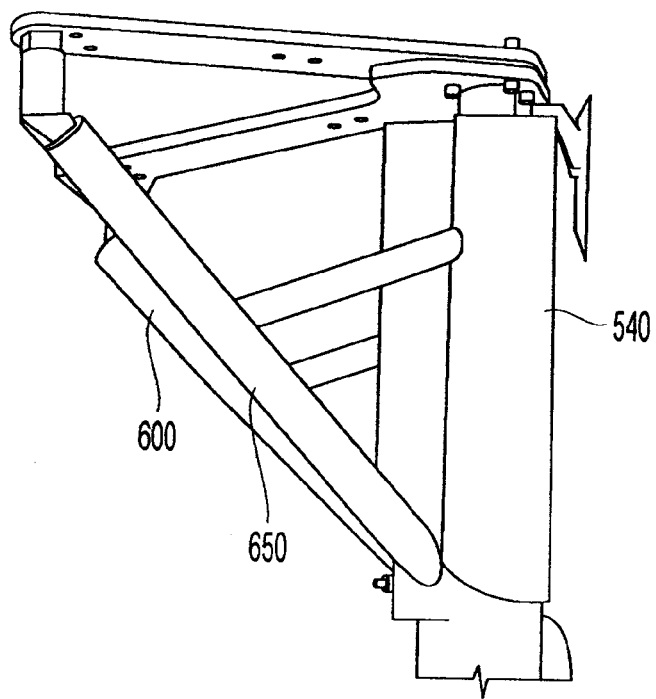
FIG. 26 is a view of fairings of the present invention.

As shown in FIGS. 17 and 26, an inflated and deployed main strut fairing 540 surrounds a large portion of the main strut of the landing gear.

As shown in FIGS. 17, 18, 22, and 24, an inflated and deployed aft strut fairing 600 envelopes all or most of the aft drag strut of the landing gear.

FIGS. 17, 22, 24, and 25, show an inflated and deployed forward drag strut fairing 650 positioned around the forward drag strut of the landing gear. The inflatable fairings 540, 600, 650 provide the main, aft, and forward struts with enhanced aerodynamic profiles.

FIG. 19 shows a cross-section of one embodiment of an inflatable fairing 100 according to the invention. In this embodiment, the fairing 100 includes an inner girt 120 and an outer girt 130. The inner and outer girts 120, 130 are joined together on either side 106, 108 of a separation 105 such as by stitching and/or adhesives. The separation 105 in the girts 120, 130 permits the fairing 100 to be wrapped around a structural member of a landing gear such as a strut. Laces 110 may be used to connect edges 106, 108 and to tighten and securely retain the inner girt 120 on the enveloped structural member 200. The laces 110 may be a nylon cord, for example. Grommets may be provided along adjacent edges 106, 108 for receiving the laces 110. Other tightening and retaining means also may be used such as straps, buckles, or the like. An inflation tube 134 is disposed between the inner girt 120 and outer girt 130 on at least one side of the structural member 200. Preferably the inflation tube is positioned opposite the laces 110. One or more hoses 104 is used to supply and extract air from the inflation tube 134. When the inflation tube 134 is inflated between the inner girt 120 and outer girt 130, the outer girt 130 takes on an enhanced aerodynamic profile like that shown in FIG. 19. More than one inflation tube 134 can be used between the inner and outer girts 120, 130 to provide the fairing 100 with a desired shape when inflated. The inner girt 120 secures the inflatable fairing to the structure 200, while the outer girt 130 is used to provide the shape of the fairing.

Figure 20:
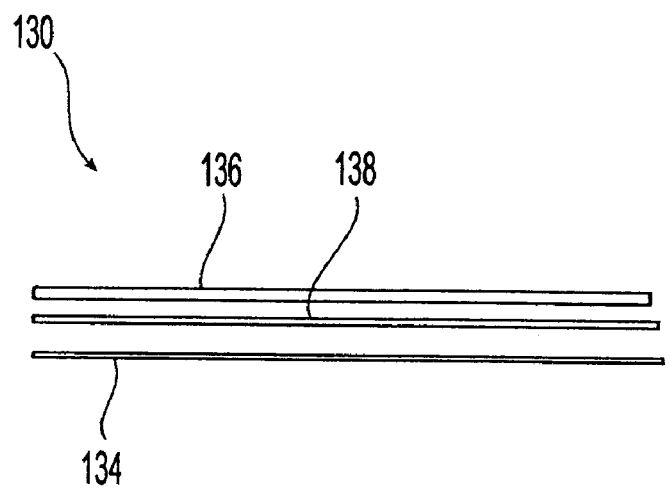
FIG. 20 is a sectional view of an outer girt construction of the present invention.

Inner girt 120 can be made from various pliable materials including, for example, a woven nylon fabric coated with polyurethane. Such materials presently are used to construct inflatable evacuation slides for commercial aircraft, for example. Outer girt 130 may be made from a combination of typical girt material and a highly durable material, such as Kevlar® fiber, to protect the inflatable fairing from debris during landing. FIG. 20 shows the construction of one embodiment of the outer girt 130, comprising an outer debris-resistant layer 136, a girt material layer 138, and the inflation tube 134. Preferably, the outer debris-resistant layer 136 and girt material layer 138 are stitched and/or bonded to one another. The girt material 138 and inflation tube 134 may be bonded to one another such as by a suitable adhesive.

Returning to FIG. 17, an inflatable main strut fairing 540 is shown in its deployed position. The main strut fairing substantially envelopes the main strut of the landing gear, providing an aerodynamic profile to attenuate noise during landing. The main strut fairing 540 covers an outer cylinder (not shown) of a conventional landing gear. During touchdown, as the inner cylinder (not shown) of the landing gear moves within the outer cylinder, the main strut fairing 540 can move relative to other components on the landing gear.

During operation, the main strut inflatable fairing 540 is designed to allow the shock strut to function both in the deployed but pre-touchdown position, and also in the post-runway, compressed position. This function is permitted by the inflatable fairing internal being configured, dimensioned and mounted so as to allow sufficient clearance for compression of the shock strut when the landing gear contacts the runway or ground surface during landing. The attachment points of the fairing 540 also avoid interference with such shock strut compression.

Figure 21:
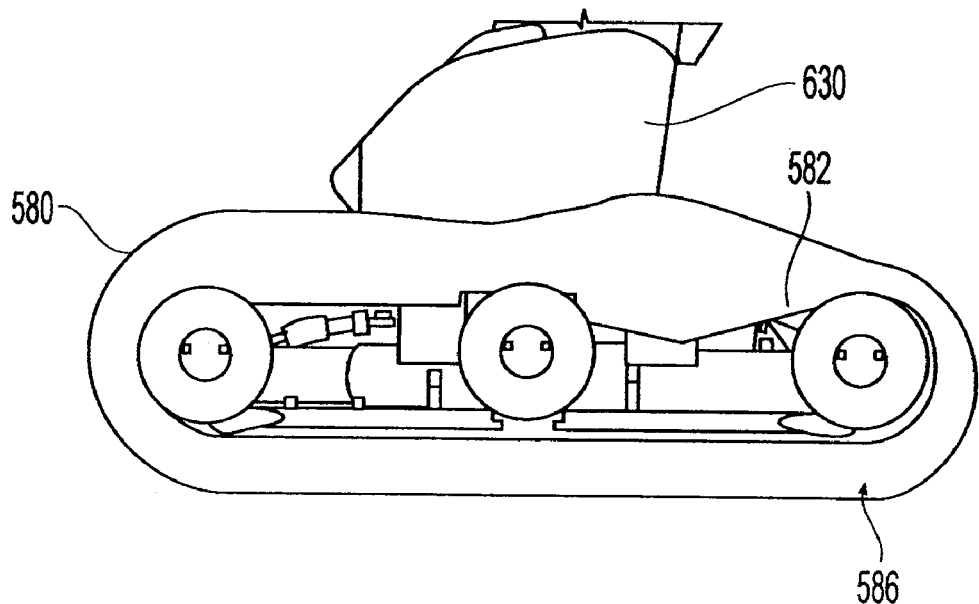
FIG. 21 is an inflatable truck fairing of the present invention, with wheels removed for clarity.
Figure 22:
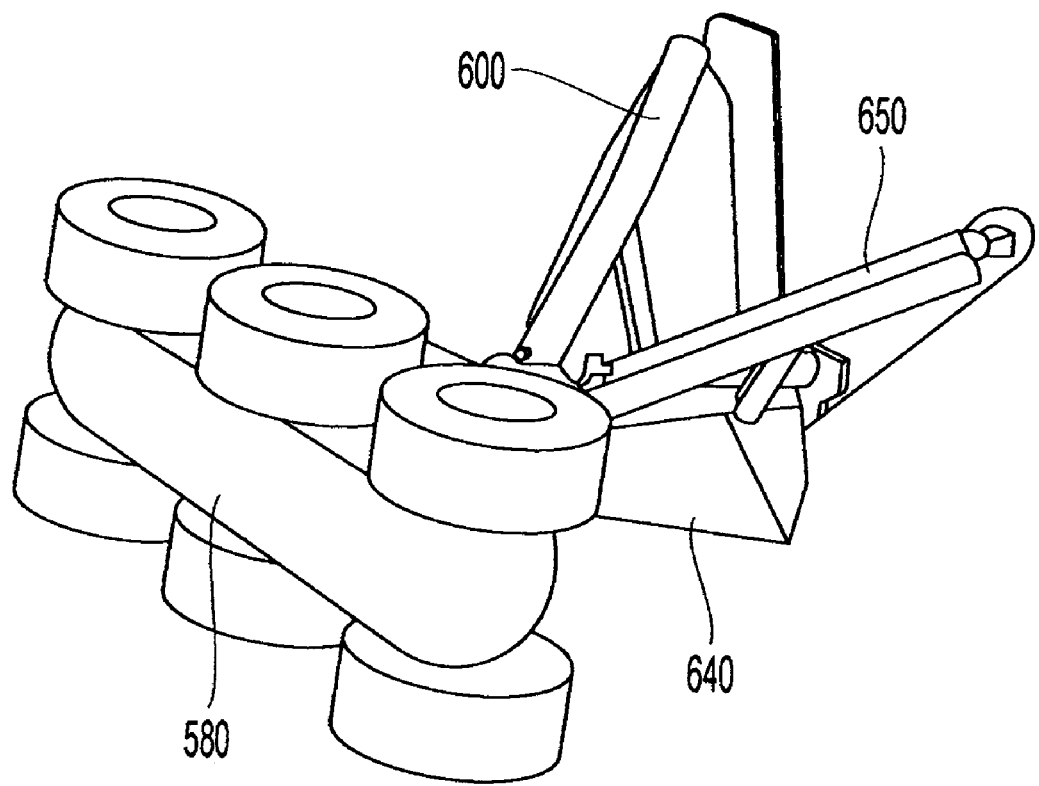
FIG. 22 is an underside view of a truck fairing of the present invention.
Figure 23:
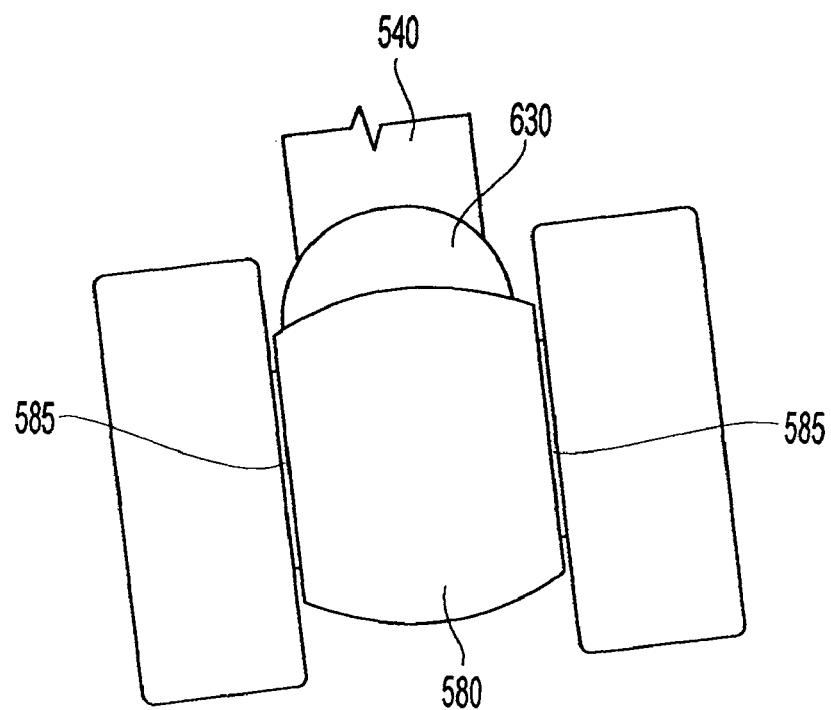
FIG. 23 is an aft view of a truck fairing of the present invention.

An inflatable truck fairing 580 also is shown in FIG. 17, as well as in FIGS. 21, 22 and 23. The inflatable truck fairing 580 can wrap substantially around a conventional truck structure like that depicted in FIGS. 5A & 5B. The top portion 582 of the truck fairing 580 can be secured by wrapping inner and outer girts around the truck. The bottom portion 586 of the truck fairing 580 can be secured by wrapping the inner and outer girts around an existing rock guard (not shown) under the truck. To keep the truck fairing 580 within the confines of the wheels of the landing gear, the inflatable fairing near the wheels can have specially shaped inner panels 585 like those depicted in FIG. 23. As described above, an inner girt is used primarily to secure the inflatable fairing to the truck and an outer girt primarily provides its shape. As shown in FIG. 23, the truck fairing 580, when inflated, is configured and dimensioned to essentially stay within the boundaries of the wheels without touching them.

Figure 24:
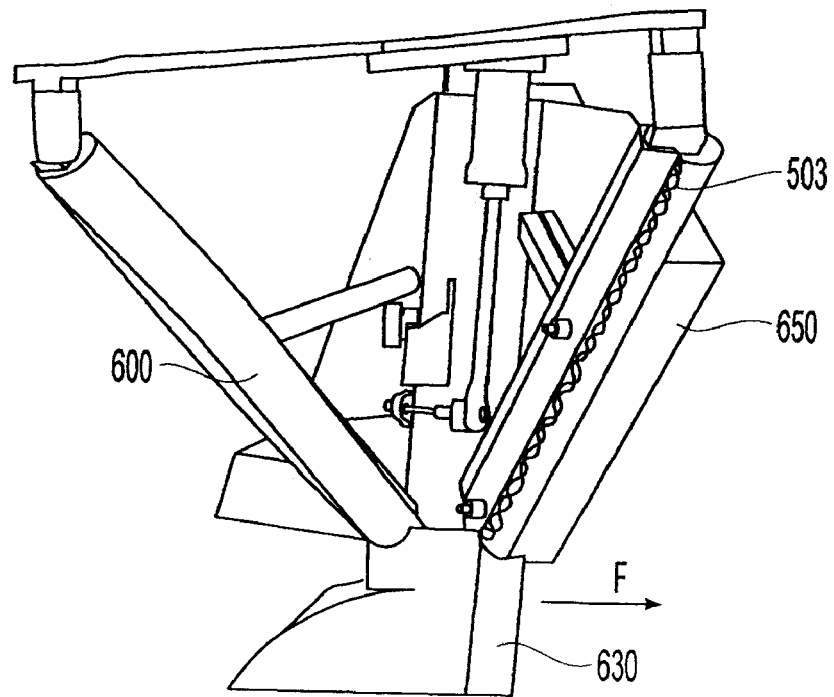
FIG. 24 are drag strut fairings of the present invention.

FIGS. 24, 25 and 26 illustrate the forward and aft drag strut fairings 600, 650. The fairings are secured to the forward and aft drag struts of the landing gear in the manner described above. As can be seen in FIG. 25, an inner girt 651 can be used to secure the inflatable fairing 650 to the strut 660 and an outer girt 652 can be used to provide the shape to the fairing. The construction of the outer girt 652 preferably is the same as that of the outer girt 130 shown in FIGS. 19 and 20. The inner girt 651 can be secured to the strut 660 using conventional methods such as a cord to lace together the separation 655 in the inner and outer girts 651, 652.

As shown in FIGS. 17, 22 and 24, a door panel fairing 640 extends between a forward edge 641 of the landing gear door panel and a side or edge 643 of the main strut fairing 540. The door panel fairing 640 can be attached to the door panel edge 641 and the main strut fairing 540 by any suitable connector or adhesive. For example, the door panel fairing 640 can be attached to the door edge 641 with mechanical fasteners such as rivets (not shown), and can be attached to the main strut fairing 540 by stitching, adhesives, hook and loop fasteners, or the like. Girt fabric panels 640 can be bonded on the leading and trailing edges 641 of the landing gear door to provide a smooth transition from the door edge to the main strut inflatable fairing. The down stream edge of the panel is attached to the main strut fairing 540 using conventional means, such as by bonding, Velcro® hook and loop fasteners, etc. When the main strut fairing 540 is inflated, the door panel(s) 640 will form an aerodynamic shape to reduce noise. In certain applications where the tension in the panel(s) 640 is not sufficient to take the air loads, the panel(s) 640 may be replaced with an inflatable door panel (not shown) that is constructed like the inflatable fairings described above, and is capable of withstanding the air loads.

FIG. 18 depicts an inflatable torque link fairing 620. The inflatable torque link fairing 620 surrounds the torque link of a landing gear and provides this portion of the landing gear with a smooth, aerodynamic shape. The torque link fairing 620 may be attached to a top surface 582 of a truck fairing 580 that underlies the torque link fairing 620. The torque link fairing 620 is designed to cover the torque link without impairing the normal movement of the torque link when the airplane lands. As shown in FIG. 17, and as further shown in FIGS. 18, 21, 23 and 24, a torque link fairing panel 630 is configured to wrap around a lower forward portion of the main strut of the landing gear and to extend afterward over each side of the inflated torque link fairing 620. The torque link fairing panel 630 may be attached to the sides of the torque link fairing 620 by any suitable fastener or fasteners, such as hook and loop fasteners. The torque link fairing panel 630 is constructed of a suitable fabric that can be collapsed or compressed to permit relative vertical motion between the truck and strut of the landing gear.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

We claim:

1. A deployable landing gear truck fairing for a deployable landing gear truck having aft, underside, and forward portions, comprising:
   an elongated body connected to a rising front portion, the elongated body and rising front portion capable of partially covering at least the underside and forward portions of the deployable landing gear truck, the elongated body having first and second lateral edges; and
   first and second compliant edges affixed to the corresponding first and second lateral edges.

2. The deployable landing gear truck fairing according to claim 1, wherein the elongated body comprises:
   a forward assembly and an aft assembly; and
   a center seal extending transverse to a direction of the elongated body and positioned between the forward and aft assemblies.

3. The deployable landing gear truck fairing according to claim 2, wherein the rising front portion is part of the forward assembly.

4. The deployable landing gear truck fairing according to claim 2, wherein forward and aft assemblies are separable from one another.

5. The deployable landing gear truck fairing according to claim 2, wherein the center seal is affixed to only one of the forward and aft assemblies.

6. The deployable landing gear truck fairing according to claim 2, wherein, when the truck fairing is mounted on deployable landing gear of an aircraft, the forward and aft assemblies move toward one another when the aircraft takes off, thereby compressing the center seal.

7. The deployable landing gear truck fairing according to claim 2, wherein at least one of the forward assembly and the aft assembly comprises an upper shield plate spaced apart from a lower shield plate.

8. The deployable landing gear truck fairing according to claim 7, further comprising a weight bearing spacer between the upper and lower shield plates.

9. The deployable landing gear truck fairing according to claim 8, wherein the weight bearing spacer is positioned beneath a support mounted on an upper side of the fairing.

10. The deployable landing gear truck fairing according to claim 7, wherein a first portion of the compliant edge occupies a region between the upper and lower shield plates, and a second portion of the compliant edge projects laterally outward from said region between the upper and lower shield plates.

11. The deployable landing gear truck fairing according to claim 8, further comprising a weight bearing spacer between the upper and lower shield plates, wherein the first portion of the compliant edge is laterally outward of the weight bearing spacer.

12. The deployable landing gear truck fairing according to claim 1, wherein the compliant edge comprises one from the group consisting of rubber or fabric stripping, fiber reinforced rubber, nylon brush, spring steel or an inflatable bladder.

13. The deployable landing gear truck fairing according to claim 1, wherein the compliant edge comprises a soft rubber or an elastomeric material.

14. The deployable landing gear truck fairing according to claim 1, wherein:
   the elongated body comprises a forward assembly and an aft assembly;
   the first lateral edge comprises adjacent first and second lateral edge portions on a first side of the fairing, the first lateral edge portion being associated with the forward assembly and the second lateral edge portion being associated with the aft assembly; and
   the second lateral edge comprises adjacent third and fourth lateral edge portions on a second side of the fairing, the third lateral edge portion being associated with the forward assembly and the fourth lateral edge portion being associated with the aft assembly.

15. The deployable landing gear truck fairing according to claim 14, further comprising:
   a first compliant edge portion affixed to the first lateral edge portion;
   a second compliant edge portion affixed to the second lateral edge portion;
   a third compliant edge portion affixed to the third lateral edge portion; and
   a fourth compliant edge portion affixed to the fourth lateral edge portion, such that the first and second compliant edge portions are adjacent to one another and the third and fourth compliant edge portions are adjacent to one another.

16. The deployable landing gear truck fairing according to claim 15, wherein, when the truck fairing is mounted on deployable landing gear of an aircraft, adjacent compliant edge portions are:
spaced apart from one another by a first distance when the aircraft is on the ground; and
move closer to one another when the aircraft is not on the ground.

17. The deployable landing gear truck fairing according to claim 16, wherein opposing surfaces of adjacent compliant edge portions abut one another when the aircraft is not on the ground.

18. The deployable landing gear truck fairing according to claim 16, wherein opposing surfaces of adjacent compliant edge portions are angled.

19. A deployable landing gear truck fairing, comprising:
a pair of adjacent fairing sections defining a forward assembly and an aft assembly suitable for mounting on a truck, each assembly having a first side and a second side;
a center seal affixed to at least one of the forward and aft assemblies and positioned between the two assemblies;
adjacent first and second compliant edge portions affixed to the first side of the forward and aft assemblies; and
adjacent third and fourth compliant edge portions affixed to the second side of the forward and aft assemblies.

20. The deployable landing gear truck fairing according to claim 19, wherein, when the truck fairing is mounted on deployable landing gear of an aircraft, adjacent compliant edge portions are:
spaced apart from one another by a first distance when the aircraft is on the ground; and
move closer to one another when the aircraft is not on the ground.

21. The deployable landing gear truck fairing according to claim 20, wherein opposing surfaces of adjacent compliant edge portions abut one another when the aircraft is not on the ground.

22. The deployable landing gear truck fairing according to claim 21, wherein opposing surfaces of adjacent compliant edge portions are angled.

23. The deployable landing gear truck fairing according to claim 19, further comprising a brake cover fairing.

24. A deployable landing gear truck fairing for a deployable landing gear of an aircraft, comprising:
an elongated body connected to a rising front portion, the elongated body having a forward assembly and an aft assembly, a center seal extending transverse to a direction of the elongated body and positioned between the forward and aft assemblies, and first and second lateral edges; and
first and second compliant edges affixed to corresponding fast and second lateral edges;
wherein, when the truck fairing is mounted on the deployable landing gear of an aircraft, the forward and aft assemblies move toward one another when the aircraft takes off, thereby compressing the center seal.

25. The deployable landing gear truck fairing according to claim 24, wherein the rising front portion is part of the forward assembly.

26. The deployable landing gear truck fairing according to claim 24, wherein forward and aft assemblies are separable from one another.

27. The deployable landing gear truck fairing according to claim 24, wherein the center seal is affixed to only one of the forward and aft assemblies.

28. A deployable landing gear truck fairing for a deployable landing gear of an aircraft, comprising:
an elongated body connected to a rising front portion, the elongated body having a forward assembly, an aft assembly, and first and second lateral edges;
the first lateral edge comprises adjacent first and second lateral edge portions on a first side of the fairing, the first lateral edge portion being associated with the forward assembly and the second lateral edge portion being associated with the aft assembly; and
the second lateral edge comprises adjacent third and fourth lateral edge portions on a second side of the fairing, the third lateral edge portion being associated with the forward assembly and the fourth lateral edge portion being associated with the aft assembly; and
first and second compliant edges affixed corresponding first and second lateral edges.

29. The deployable landing gear truck fairing according to claim 28, further comprising:
a first compliant edge portion affixed to the first lateral edge portion;
a second compliant edge portion affixed to the second lateral edge portion;
a third compliant edge portion affixed to the third lateral edge portion; and
a fourth compliant edge portion affixed to the fourth lateral edge portion,
such that the first and second compliant edge portions are adjacent to one another and the third and fourth compliant edge portions are adjacent to one another.

30. The deployable landing gear truck fairing according to claim 29, wherein, when the truck fairing is mounted on the deployable landing gear of an aircraft, adjacent compliant edge portions are:
spaced apart from one another by a first distance when the aircraft is on the ground; and
move closer to one another when the aircraft is not on the ground.

31. The deployable landing gear truck fairing according to claim 30, wherein opposing surfaces of adjacent compliant edge portions abut one another when the aircraft is not on the ground.

32. The deployable landing gear truck fairing according to claim 31, wherein opposing surfaces of adjacent compliant edge portions are angled.

* * * * *